US012191132B2

(12) United States Patent
Le Blanc et al.

(10) Patent No.: US 12,191,132 B2
(45) Date of Patent: Jan. 7, 2025

(54) METHOD FOR MASS SPECTROMETRY

(71) Applicant: DH TECHNOLOGIES DEVELOPMENT PTE. LTD., Singapore (SG)

(72) Inventors: Yves Le Blanc, Newmarket (CA); David M. Cox, Toronto (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 377 days.

(21) Appl. No.: 17/753,035

(22) PCT Filed: Aug. 22, 2020

(86) PCT No.: PCT/IB2020/057882
§ 371 (c)(1),
(2) Date: Feb. 16, 2022

(87) PCT Pub. No.: WO2021/038417
PCT Pub. Date: Mar. 4, 2021

(65) Prior Publication Data
US 2022/0359181 A1 Nov. 10, 2022

Related U.S. Application Data

(60) Provisional application No. 62/894,351, filed on Aug. 30, 2019.

(51) Int. Cl.
*H01J 49/04* (2006.01)
*H01J 49/00* (2006.01)
*H01J 49/16* (2006.01)

(52) U.S. Cl.
CPC ...... *H01J 49/0431* (2013.01); *H01J 49/0072* (2013.01); *H01J 49/165* (2013.01)

(58) Field of Classification Search
CPC .... H01J 49/004; H01J 49/0045; H01J 49/005; H01J 49/0054; H01J 49/0059;
(Continued)

(56) References Cited

U.S. PATENT DOCUMENTS

2018/0052140 A1 2/2018 Yokoi
2022/0359178 A1* 11/2022 Le Blanc ............ H01J 49/0036

FOREIGN PATENT DOCUMENTS

GB 2564988 A 1/2019
JP H03 63565 A 3/1991
(Continued)

OTHER PUBLICATIONS

WO-2018029847-A1, machine translation (Year: 2018).*
(Continued)

*Primary Examiner* — Michael J Logie
(74) *Attorney, Agent, or Firm* — Potomac Law Group, PLLC; Reza Mollaaghababa; Ido Rabinovitch

(57) ABSTRACT

Before a sample is introduced into a liquid sample delivery device, an ion source device receives aqueous mobile phase solution from the liquid sample delivery device and ionizes compounds of the aqueous mobile phase solution, producing an ion beam. A tandem mass spectrometer performs a first neutral loss scan of the ion beam with a first neutral loss value set to a molecular weight of a first known solvent, producing a first intensity, and performs a second neutral loss scan of the ion beam with a second neutral loss value set to a molecular weight of a second known solvent, producing a second intensity. A ratio of the first intensity to the second intensity is calculated. It is determined if the aqueous mobile phase solution is properly being delivered by the liquid sample delivery device based on the ratio.

20 Claims, 18 Drawing Sheets

(58) Field of Classification Search
CPC ............... H01J 49/0063; H01J 49/0068; H01J 49/0072; H01J 49/0077; H01J 49/0009; H01J 49/0036; H01J 49/0431; H01J 49/10; H01J 49/165; G01N 30/86; G01N 27/62; G01N 30/02; G01N 30/34; G01N 30/72; G01N 33/49; G01N 35/00
See application file for complete search history.

(56) References Cited

FOREIGN PATENT DOCUMENTS

| | | | | |
|---|---|---|---|---|
| WO | 2017034972 | A1 | | 3/2017 |
| WO | WO-2018029847 | A1 | * | 2/2018 |
| WO | WO-2023054125 | A1 | * | 4/2023 |

OTHER PUBLICATIONS

WO-2023054125-A1, machine translation (Year: 2023).*
International Search Report and Written Opinion for PCT/IB2020/057882, mailed Nov. 20, 2020.

* cited by examiner

| PEAK | INTENSITY CPS | AREA |
| --- | --- | --- |
| Methanol (65.2) | 7.01e5 | 3.58e6 |
| Acetonitrile (83.2) | 1.00e4 | 2.53e4 |

1100

FIG. 11

METHOD FOR MASS SPECTROMETRY

RELATED APPLICATIONS

This application claims the benefit of U.S. Provisional Patent Application Ser. No. 62/894,351 filed on Aug. 30, 2019, the content of which is incorporated by reference herein in its entirety.

INTRODUCTION

The teachings herein relate to mass spectrometry apparatus for determining if an aqueous mobile phase solution is properly being delivered by a mass spectrometry liquid sample delivery device. More specifically, an ion source device ionizes the aqueous mobile phase solution of a liquid sample delivery device before a sample is introduced into a liquid sample delivery device. A tandem mass spectrometer performs two or more neutral loss scans on the ions of the aqueous mobile phase solution using neutral losses based on molecular weights of two or more known solvents. If the neutral loss scans detect a known solvent, it is determined that the aqueous mobile phase solution is properly being delivered by the liquid sample delivery device. The rate of change in the intensities of the two or more neutral loss scans is also monitored at multiple time steps before a sample is introduced into a liquid sample delivery device to determine when the liquid sample delivery device reaches a steady state.

The apparatus and methods disclosed herein can be performed in conjunction with a processor, controller, microcontroller, or computer system, such as the computer system of FIG. 1.

Mass Spectrometry Background

Mass spectrometry (MS) is an analytical technique for detection and quantitation of chemical compounds based on the analysis of m/z values of ions formed from those compounds. MS involves ionization of one or more compounds of interest from a sample, producing precursor ions, and mass analysis of the precursor ions.

Tandem mass spectrometry or mass spectrometry/mass spectrometry (MS/MS) involves ionization of one or more compounds of interest from a sample, selection of one or more precursor ions of the one or more compounds, fragmentation of the one or more precursor ions into product ions, and mass analysis of the product ions.

Both MS and MS/MS can provide qualitative and quantitative information. The measured precursor or product ion spectrum can be used to identify a molecule of interest. The intensities of precursor ions and product ions can also be used to quantitate the amount of the compound present in a sample.

Tandem mass spectrometry can be performed using many different types of scan modes. For example, quadrupole tandem mass spectrometers can typically perform a product ion scan, a neutral loss scan, a precursor ion scan, and a selected reaction monitoring (SRM) or a multiple reaction monitoring (MRM) scan.

A product ion scan typically follows the MS/MS method described above. A collection of precursor ions is selected by a quadrupole mass filter. Each of the precursor ions of the collection is fragmented in a quadrupole collision cell. All of the resulting product ions for each precursor ion are then selected and mass analyzed using a quadrupole mass analyzer, producing a product ion spectrum for each precursor ion. A product ion scan is used, for example, to identify all of the products of a particular precursor ion.

In a neutral loss scan, both a first mass analyzer (Q1) and a second mass analyzer (Q3) scan a mass range, a fixed mass apart. A response or intensity and m/z is observed or measured for the precursor ion, if the precursor ion chosen by the Q1 quadrupole fragments by losing the neutral loss (the fixed mass) specified. This scan is used to confirm the presence of a precursor ion or, more commonly, to identify compounds sharing a common neutral loss.

In a precursor ion scan, the Q3 second mass analyzer is fixed at a specified mass-to-charge ratio to transmit a specific product ion and the Q1 mas analyzer scans a mass range. A response or intensity and m/z is observed or measured for the precursor ion, if the specific product ion is found. This scan is used to confirm the presence of a precursor ion or, more commonly, to identify compounds sharing a common product ion.

In an SRM or MRM scan, at least one precursor ion and product ion pair is known in advance. The quadrupole mass filter then selects the one precursor ion. The quadrupole collision cell fragments the precursor ion. However, only product ions with the m/z of the product ion of the precursor ion and product ion pair are selected and mass analyzed using a quadrupole mass analyzer, producing an intensity for the product ion of the precursor ion and product ion pair. In other words, only one product ion is monitored. An SRM or MRM scan is used, for example, primarily for quantitation.

Liquid Sample Delivery Device Background

FIG. 2 is an exemplary diagram of a liquid sample delivery device 200 for a mass spectrometer. Liquid sample delivery device 200 includes two separate devices. It includes high-performance liquid chromatography (HPLC) device 210 and direct infusion or injection device 220.

In HPLC device 210, one of two solvents 211 or 212 is selected using valve 215. Solvents 211 or 212 are moved to valve 215 using pumps 213 and 214, respectively. Sample 216 is mixed with the selected solvent using mixer 217, and the resulting mixture is sent through liquid chromatography (LC) column 218. Sample 216 is selected using autosampler 219, for example.

In direct infusion or injection device 220, a sample is already mixed with a solvent in fluidic pump 221. Fluidic pump 221 is shown as a syringe pump but can be any type of pump.

The use of HPLC device 210 or direct infusion or injection device 220 is selected using valve 230. The selected mixture or mobile phase composition is sent from valve 230 to an ion source (not shown) of a mass spectrometer (not shown).

Mobile phase additives (not shown), such as formic acid, acetic acid, ammonium formate, and others, can also be added to the mixture of HPLC device 210 before LC column 218 or to the mixture already in fluidic pump 221 of direct infusion or injection device 220.

Currently, assessing if a proper mobile phase composition is delivered from liquid sample delivery device 200 to a mass spectrometer or if liquid sample delivery device 200 is properly equilibrated relies on customer education and training regarding the operation of liquid sample delivery device 200. Reliance on this specific education and training often breaks down in a multi-user environment where the level of training and knowledge is broad. As a result, the risk of starting an acquisition under non-ideal conditions is increased. For example, an acquisition may be started when the system is not equilibrated, when a wrong mobile phase has been selected, or when the wrong mobile phase additive has been used.

As a result, apparatus and methods are needed that offer the ability to assess that proper conditions are being used and are ready (properly equilibrated) before analysis as well as during customer sample acquisition. Such apparatus and methods could offer increased confidence in the data generated by the system.

International Patent Application Publication No. WO2017034972 (hereinafter the "'972 Publication") describes a method of monitoring the performance of an atmospheric pressure ionization (API) system. Specifically, the '972 Publication provides a method in which an ion-molecule cluster that is formed in the API system is monitored. Once the ion-molecule cluster is identified, it is monitored along with sample ions using an SRM scan. One way the '972 Publication identifies the product ion to be used in an SRM scan of the ion-molecule cluster is to perform a neutral loss scan based on the molecular weight of a solvent ion.

SUMMARY

An apparatus, method, and computer program product are disclosed for determining if an aqueous mobile phase solution is properly being delivered by a mass spectrometry liquid sample delivery device, in accordance with various embodiments. The apparatus includes an ion source device and a tandem mass spectrometer.

Before a sample is introduced into a liquid sample delivery device, the ion source device receives aqueous mobile phase solution from the liquid sample delivery device and ionizes compounds of the aqueous mobile phase solution, producing an ion beam of aqueous mobile phase solution compounds.

Also, before the sample is introduced into the liquid sample delivery device, the tandem mass spectrometer receives the ion beam of aqueous mobile phase solution compounds from the ion source device. The tandem mass spectrometer performs a first neutral loss scan of the ion beam with a first neutral loss value set to a molecular weight of a first known solvent, producing a first intensity. The tandem mass spectrometer performs a second neutral loss scan of the ion beam with a second neutral loss value set to a molecular weight of a second known solvent, producing a second intensity.

The tandem mass spectrometer then calculates a ratio of the first intensity to the second intensity. The tandem mass spectrometer determines if the aqueous mobile phase solution is properly being delivered by the liquid sample delivery device based on the ratio.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

FIG. 11 is a table depicting the measured intensities and peak areas of the methanol and acetonitrile peaks of FIGS. 9 and 10, respectively, in accordance with various embodiments.

Figure 1:
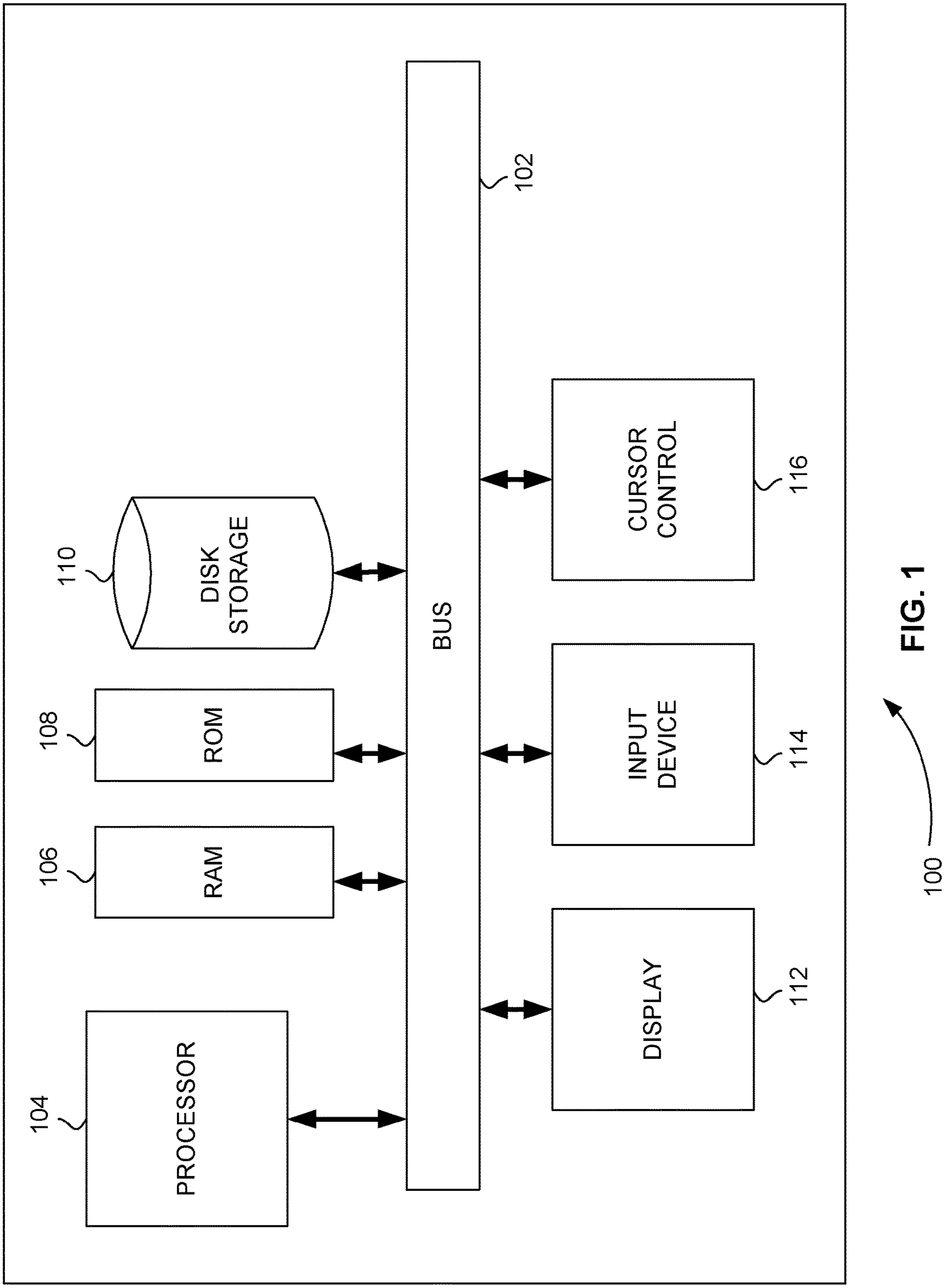
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Apparatus and Methods for Assessing Liquid Sample Delivery

As described above, assessing if a proper mobile phase composition is delivered from a liquid sample delivery device to a mass spectrometer or if a liquid sample delivery device is properly equilibrated relies on customer education and training regarding the operation of the liquid sample delivery device. Reliance on this specific education and training often breaks down in a multi-user environment where the level of training and knowledge is broad. As a result, the risk of starting an acquisition under non-ideal conditions is increased.

As a result, apparatus and methods are needed that offer the ability to assess that proper conditions are being used and are ready (properly equilibrated) before analysis as well as during a customer sample acquisition. The '972 Publication describes methods to monitor the performance of an atmospheric pressure ionization (API) system. However, the methods of the '972 Publication require the prior identification of a specific ion-molecule cluster product ion so that this product ion can be monitored using SRM. The '972 Publication is also directed to determining if a sample previously ran correctly. The '972 Publication is not directed to determining if the system is ready to run. Consequently, additional methods are needed that do not require identification of a specific ion-molecule cluster product ion and are specifically directed to determining if the system is ready to run.

In various embodiments, before a sample is introduced into a liquid sample delivery device, two or more neutral loss scans are performed on the ions of an aqueous mobile phase solution using neutral losses based on molecular weights of two or more known solvents. In this method, there is no need to identify a specific ion-molecule cluster product ion. In addition, this method is directed to determining if a system is ready to run.

In LC-MS/MS or in direct injection or infusion MS/MS, a solvent is mixed with a sample to create a proper mobile phase composition. Common solvents include a mixture of water and methanol or a mixture of water and acetonitrile. Also, a mobile phase additive or buffer is frequently used in combination with a solvent.

When mobile phase ions are generated by an ion source, using either electrospray ionization (ESI) or atmospheric pressure chemical ionization (APCI), it is possible to monitor a series of protonated solvent related ions (as well as dimers, trimers, and tetramers) that are naturally generated by the source. Performing MS/MS analysis on any of these species generates a constant loss that is representative of the solvent molecular weight (MW).

Therefore, in various embodiments, a neutral loss scan is performed using the mass associated with the molecular weight of a solvent (such as MeOH=32, Acetonitrile=41, IPA=60, or Acetone=58). From the neutral loss scan, an assessment of the system spraying and ionizing these solvent species can be made in a very selective way. After the assessment, feedback is provided to the user. By performing a neutral loss scan, a snap shot of all species generated by the solvent used is obtained, producing a representative spectrum of the dimer up to the tetramer for the organic solvent used.

Experimental conditions, once equilibration is achieved, yield a constant ratio between the detected species within the neutral loss scan and serve as a basis to determine if the system is ready for sample analysis or performing under constant conditions (nothing changed since last analysis).

In various embodiments, information is collected before customer sample analysis, where a series of neutral loss scans are performed to determine if the system is still spraying under similar conditions within the batch. The presence of ions generated by a specific neutral loss mass determines whether the expected mobile phase is present or if system performance has changed.

In various embodiments, the goal is to perform these analyses in an agnostic way—using customer experimental conditions and with little or no information supplied by the user. These analyses can identify problems including, but not limited to, a wrong mobile phase (masses detected for more than one solvent), a leak in the liquid delivery device (signal variability), a check-valve error, source temperature differences (unstable ratio of ion current from neutral loss scans), a leak between the liquid delivery device and the mass spectrometer (no signal detected—a blocked probe that caused a leak or column over pressure).

Aqueous Mobile Phase Solution Deliver Assessment Apparatus

Figure 3:
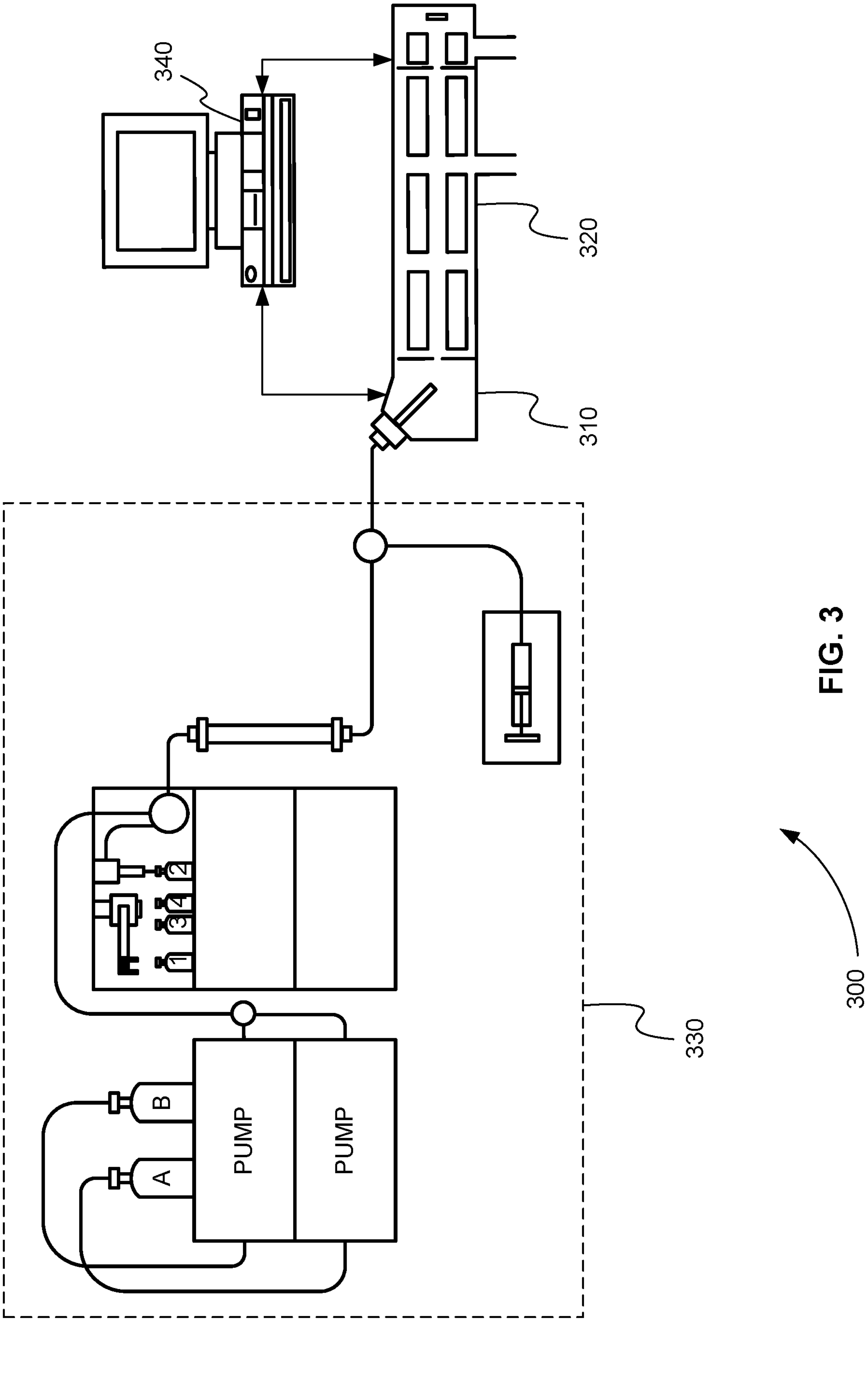
FIG. 3 is a schematic diagram of apparatus for determining if an aqueous mobile phase solution is properly being delivered by a mass spectrometry liquid sample delivery device, in accordance with various embodiments.

FIG. 3 is a schematic diagram 300 of apparatus for determining if an aqueous mobile phase solution is properly being delivered by a mass spectrometry liquid sample delivery device, in accordance with various embodiments. The apparatus includes ion source device 310 and tandem mass spectrometer 320.

Ion source device 310 is preferably an electrospray ionization (ESI) ion source device or an atmospheric pressure chemical ionization (APCI) ion source device. In various alternative embodiments, ion source device 310 can be any type of ion source device.

Tandem mass spectrometer 320 is preferably a triple quadrupole (QqQ) device or a quadrupole quadrupole linear ion trap (QqLIT) device. In various alternative embodiments, tandem mass spectrometer 320 can be any type of tandem mass spectrometer capable of performing a neutral loss scan or pseudo-neutral loss scan by comparing spectra collected at two different collision energy (e.g.: QqTOF or Orbitrap).

Figure 2:
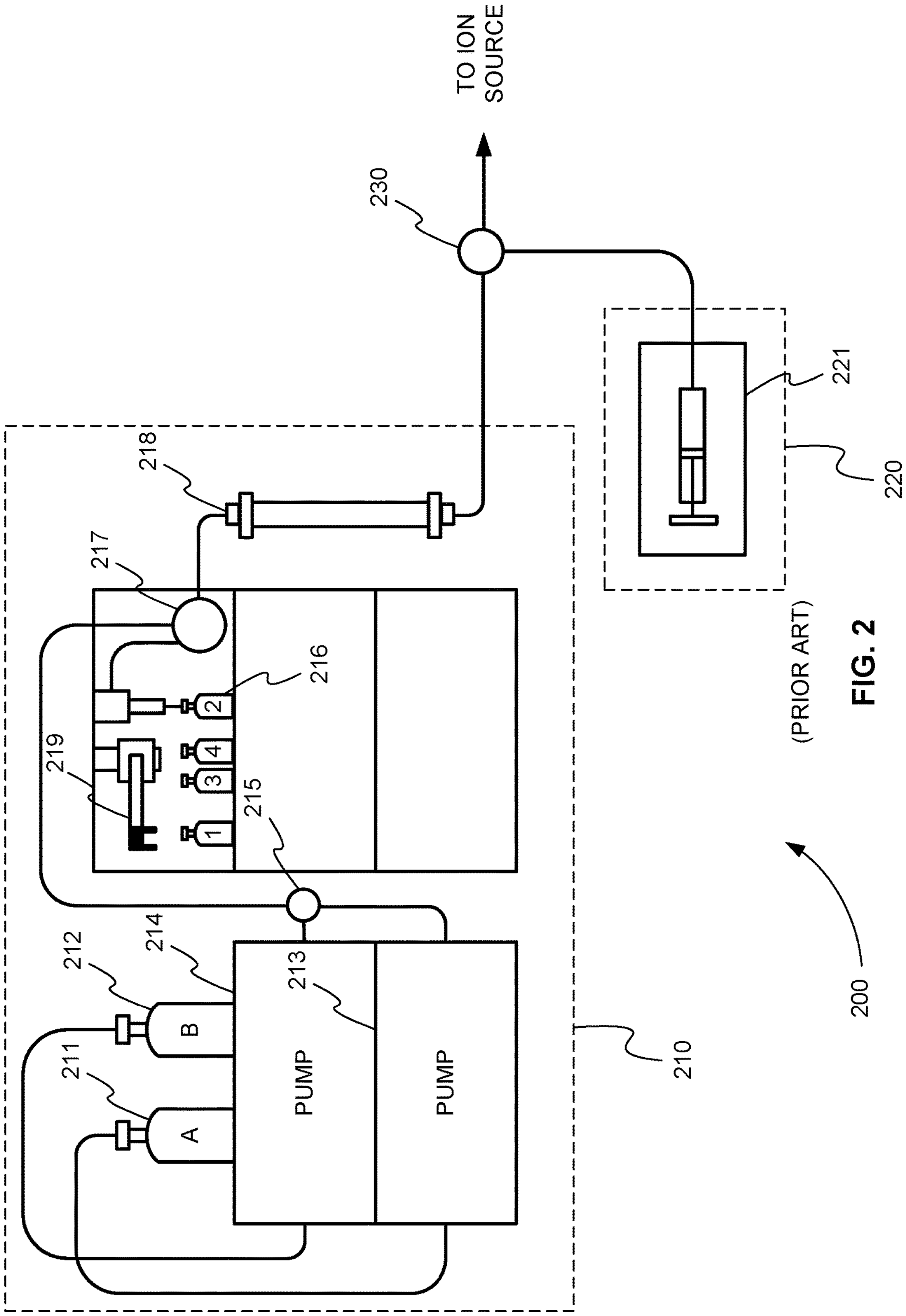
(PRIOR ART) FIG. 2
FIG. 2 is an exemplary diagram of a liquid sample delivery device for a mass spectrometer.

Before a sample is introduced into liquid sample delivery device 330, ion source device 310 receives aqueous mobile phase solution from liquid sample delivery device 330 and ionizes compounds of the aqueous mobile phase solution, producing an ion beam of aqueous mobile phase solution compounds. Liquid sample delivery device 330 is, for example, the liquid sample delivery device of FIG. 2. Before a sample is introduced into liquid sample delivery device 330 can mean, for example, before the first sample is introduced into liquid sample delivery device 330. It can also mean ionizing compounds of the aqueous mobile phase solution between sample introductions into liquid sample delivery device 330.

Before a sample is introduced into liquid sample delivery device 330, tandem mass spectrometer 320 receives the ion beam of aqueous mobile phase solution compounds from ion source device 310. Tandem mass spectrometer 320 performs a first neutral loss scan of the ion beam with a first neutral loss value set to a molecular weight of a first known solvent, producing a first intensity. Tandem mass spectrometer 320 performs a second neutral loss scan of the ion beam with a second neutral loss value set to a molecular weight of a second known solvent, producing a second intensity.

Tandem mass spectrometer 320 then calculates a ratio of the first intensity to the second intensity. Tandem mass spectrometer 320 determines that the aqueous mobile phase solution is properly being delivered by liquid sample delivery device 330 based on the ratio.

Figure 4:
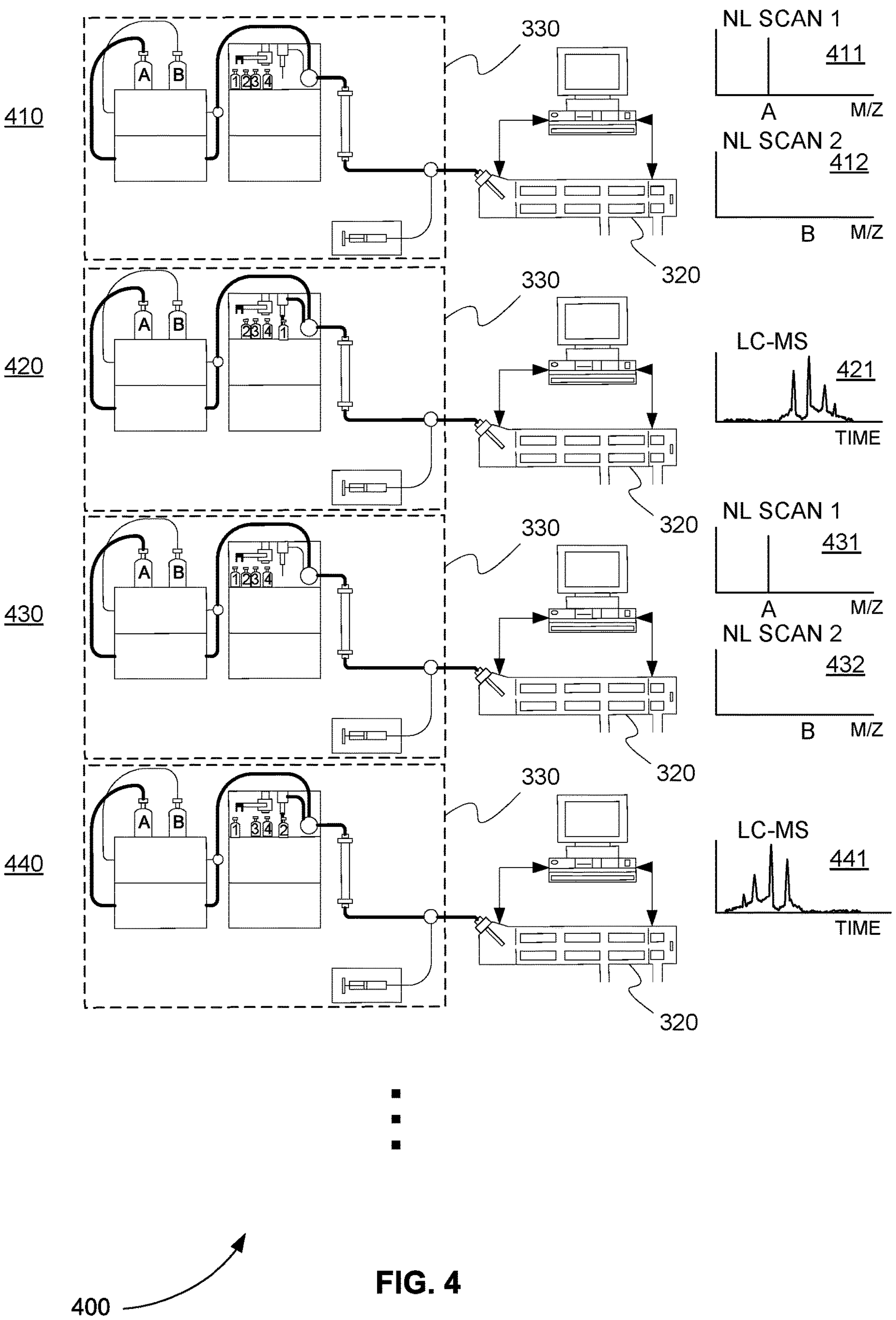
FIG. 4 is a schematic diagram showing that diagnostic experiments can take place before a first sample is introduced into a liquid sample delivery device and between additional sample introductions into the liquid sample delivery device to determine if an aqueous mobile phase solution is properly being delivered by the liquid sample delivery device, in accordance with various embodiments.

FIG. 4 is a schematic diagram 400 showing that diagnostic experiments can take place before a first sample is introduced into a liquid sample delivery device and between additional sample introductions into the liquid sample delivery device to determine if an aqueous mobile phase solution is properly being delivered by the liquid sample delivery device, in accordance with various embodiments. For example, diagnostic experiment 410 is performed before a first sample is introduced into a liquid sample delivery device. As described above, before a sample is introduced into liquid sample delivery device 330, tandem mass spectrometer 320 performs a first neutral loss scan of an ion beam with a first neutral loss value set to a molecular weight of a first known solvent, producing a first intensity. In diagnostic experiment 410, the first intensity measured for first known solvent A is shown in spectrum 411.

Also, as described above, tandem mass spectrometer 320 performs a second neutral loss scan of the ion beam with a second neutral loss value set to a molecular weight of a second known solvent, producing a second intensity. In diagnostic experiment 410, the second intensity measured for second known solvent B is shown in spectrum 412. Tandem mass spectrometer 320 then calculates a ratio of the first intensity to the second intensity to determine if the aqueous mobile phase solution is properly being delivered by liquid sample delivery device 330. In other words, spectrum 411 and spectrum 412 are compared to determine if the aqueous mobile phase solution is properly being delivered by liquid sample delivery device 330.

In sample experiment 420, a sample is then introduced into liquid sample delivery device 330. In sample experiment 420, the autosampler of liquid sample delivery device 330 selects sample 1 and this sample is analyzed using LC-MS. Chromatogram 421, for example, is produced from the LC-MS analysis of sample 1.

Experiments to determine if an aqueous mobile phase solution is properly being delivered by a mass spectrometry liquid sample delivery device can also be performed between sample introductions into the liquid sample delivery device. Diagnostic experiment 430 is performed between sample experiments 420 and 440. Diagnostic experiment 430 is performed, for example, while the autosampler of liquid sample delivery device 330 is changing samples.

In diagnostic experiment 430, like in diagnostic experiment 410, tandem mass spectrometer 320 again performs a first neutral loss scan of an ion beam with a first neutral loss value set to a molecular weight of a first known solvent, producing a first intensity. In diagnostic experiment 430, the first intensity measured for first known solvent A is shown in spectrum 431. Tandem mass spectrometer 320 performs a second neutral loss scan of the ion beam with a second neutral loss value set to a molecular weight of a second known solvent, producing a second intensity. In diagnostic experiment 430, the second intensity measured for second known solvent B is shown in spectrum 432.

Again, tandem mass spectrometer 320 calculates a ratio of the first intensity to the second intensity to determine if the aqueous mobile phase solution is properly being delivered by liquid sample delivery device 330. In other words, spectrum 431 and spectrum 432 are compared to determine if the aqueous mobile phase solution is properly being delivered by liquid sample delivery device 330.

After diagnostic experiment 430 is performed, sample experiment 440 is begun. In sample experiment 440, another sample is introduced into liquid sample delivery device 330. In sample experiment 440, the autosampler of liquid sample delivery device 330 selects sample 2 and this sample is analyzed using LC-MS. Chromatogram 441, for example, is produced from the LC-MS analysis of sample 2.

The process of performing diagnostic experiments between sample experiments continues until all sample experiments are completed. In this way, liquid sample delivery device 330 is continually monitored to ensure that it is properly functioning.

Figure 5:
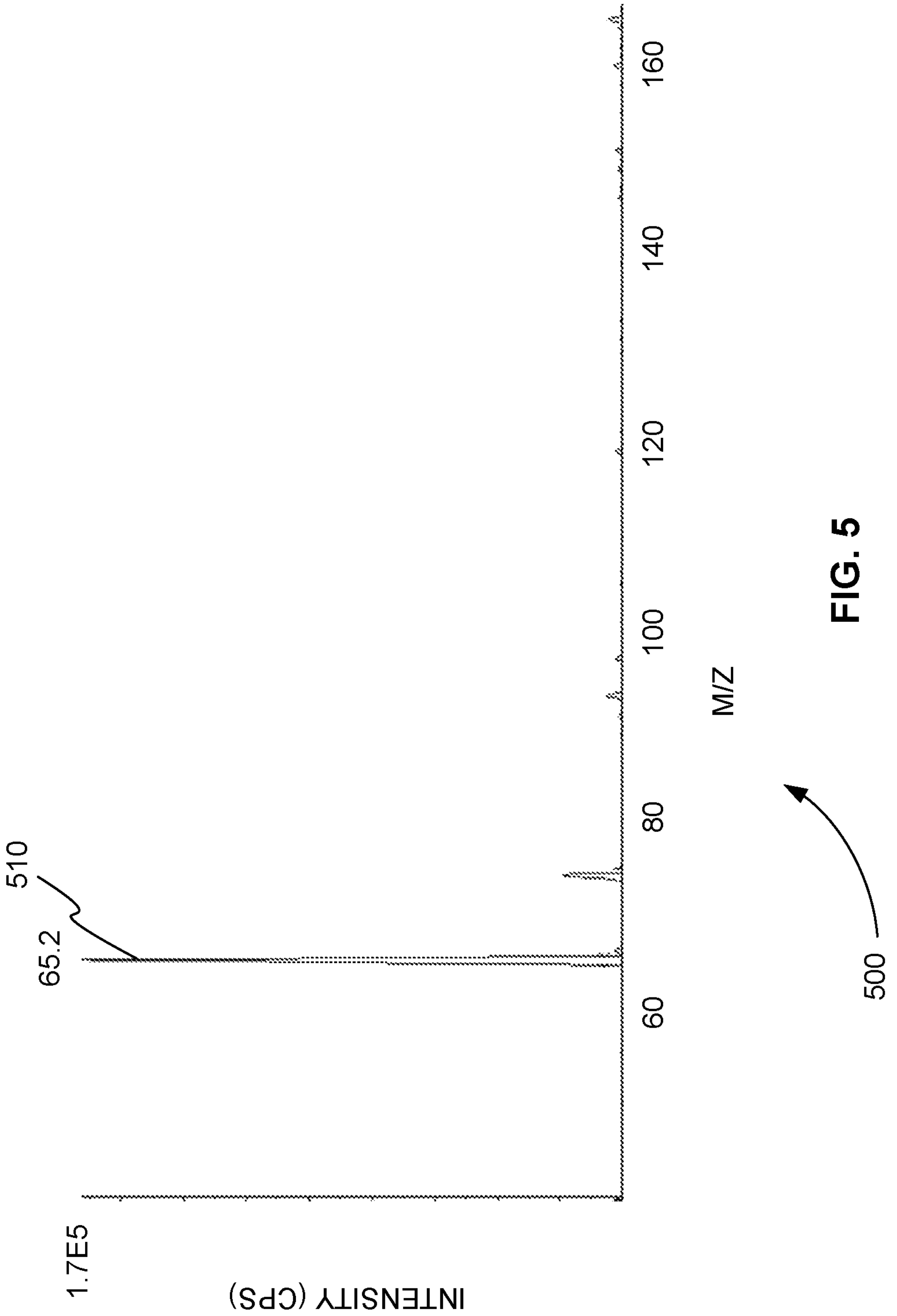
FIG. 5 is an exemplary plot of a neutral loss spectrum showing the intensity of a precursor ion found by performing a neutral loss scan on a first aqueous mobile phase solution with a neutral loss value set to the molecular weight (32) of methanol using a tandem mass spectrometer, in accordance with various embodiments.

FIG. 5 is an exemplary plot 500 of a neutral loss spectrum showing the intensity of a precursor ion found by performing a neutral loss scan on a first aqueous mobile phase solution with a neutral loss value set to the molecular weight (32) of methanol using a tandem mass spectrometer, in accordance with various embodiments. Peak 510 represents a solvent cluster with methanol that will form in an aqueous mobile phase solution with or without acid modifiers. Peak 510 is high intensity distinctive ion.

Figure 6:
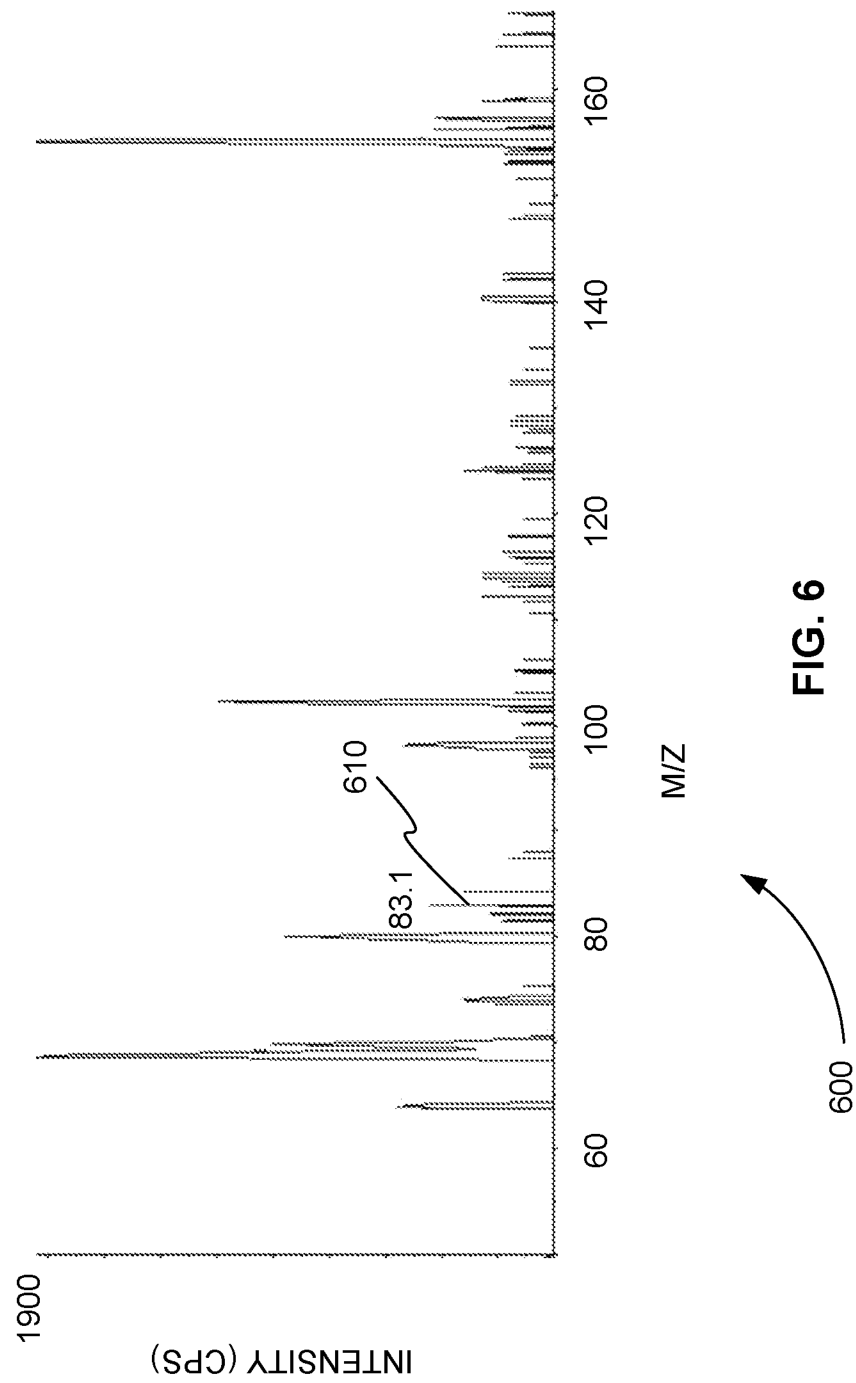
FIG. 6 is an exemplary plot of a neutral loss spectrum showing the intensity of a precursor ion found by performing a neutral loss scan on the same first aqueous mobile phase solution as in FIG. 5 with a first neutral loss value set to the molecular weight (41) of acetonitrile using a tandem mass spectrometer, in accordance with various embodiments.

FIG. 6 is an exemplary plot 600 of a neutral loss spectrum showing the intensity of a precursor ion found by performing a neutral loss scan on the same first aqueous mobile phase solution as in FIG. 5 with a first neutral loss value set to the molecular weight (41) of acetonitrile using a tandem mass spectrometer, in accordance with various embodiments. Peak 610 represents a solvent cluster with acetonitrile that will form in an aqueous mobile phase solution with or without acid modifiers. A comparison of FIG. 6 with FIG. 5 shows that relative to methanol peak 510 in FIG. 5, acetonitrile peak 610 in FIG. 6 is weak or absent. In other words, a comparison of FIG. 6 with FIG. 5 shows that methanol is the likely solvent of the first aqueous mobile phase solution.

Figure 7:
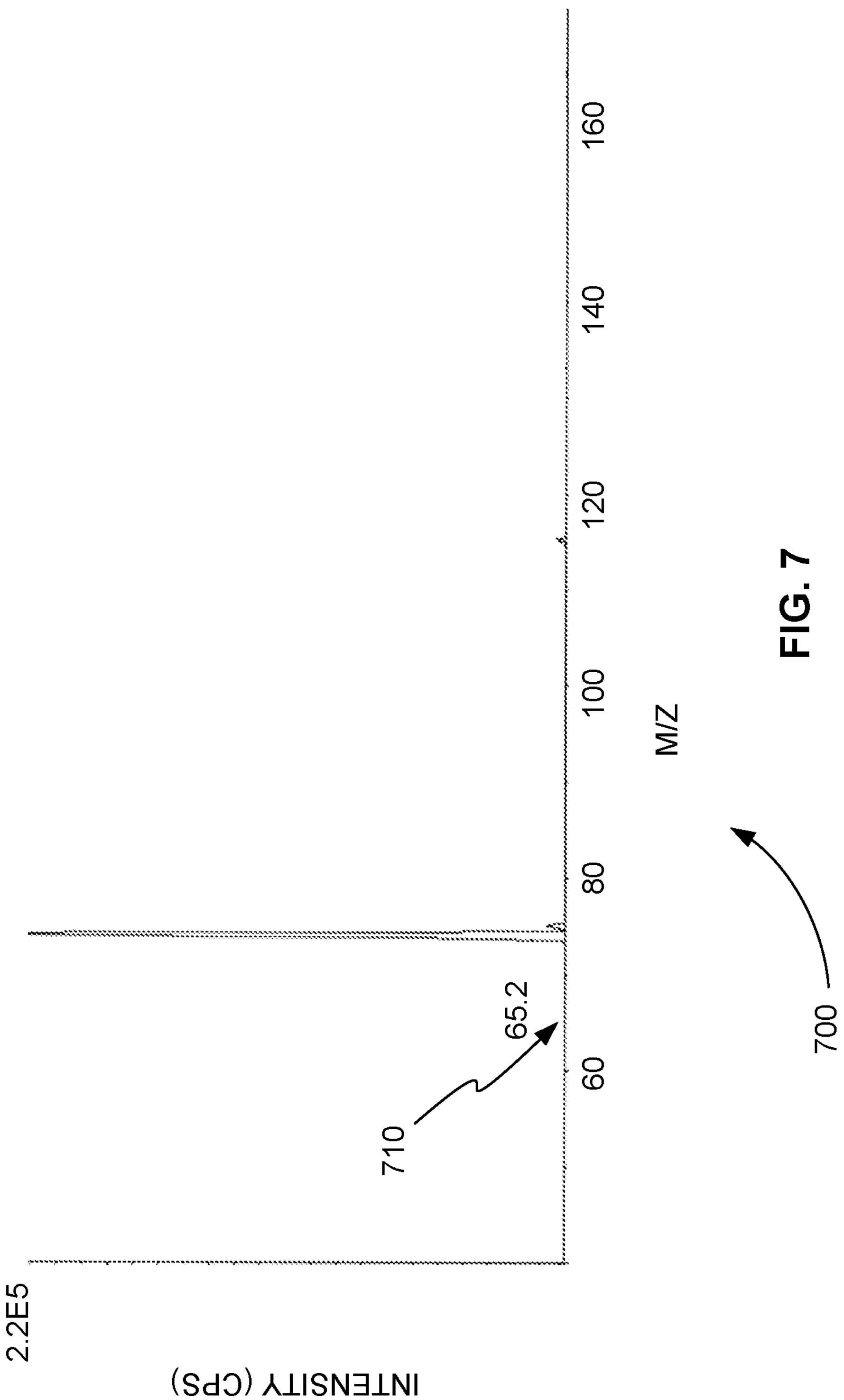
FIG. 7 is an exemplary plot of a neutral loss spectrum showing the intensity of a precursor ion found by performing a neutral loss scan on a second aqueous mobile phase solution with a neutral loss value set to the molecular weight (32) of methanol using a tandem mass spectrometer, in accordance with various embodiments.

FIG. 7 is an exemplary plot 700 of a neutral loss spectrum showing the intensity of a precursor ion found by performing a neutral loss scan on a second aqueous mobile phase solution with a neutral loss value set to the molecular weight (32) of methanol using a tandem mass spectrometer, in accordance with various embodiments. Peak 710 represents a solvent cluster with methanol. Peak 710 is weak or absent.

Figure 8:
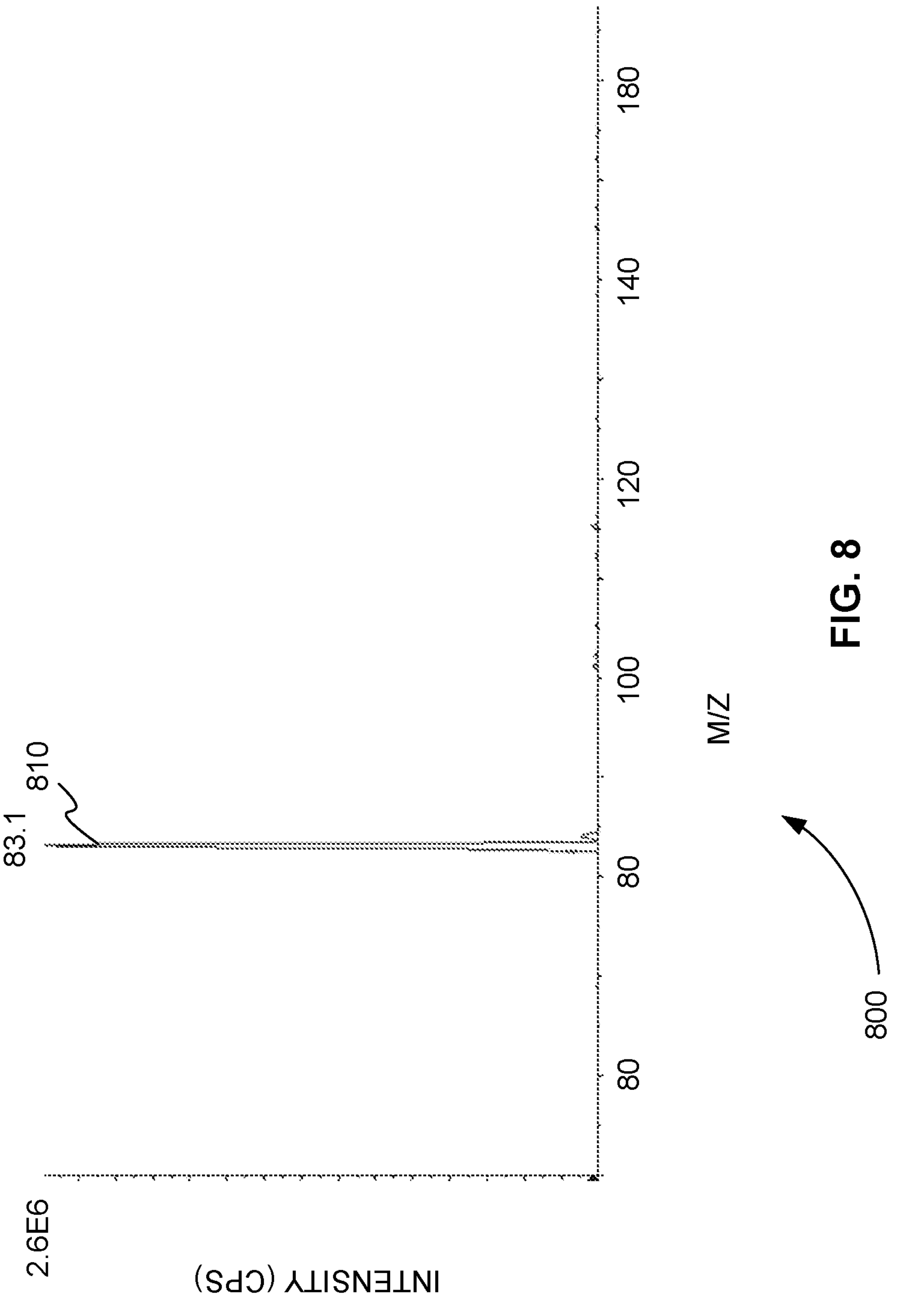
FIG. 8 is an exemplary plot of a neutral loss spectrum showing the intensity of a precursor ion found by performing a neutral loss scan on the same second aqueous mobile phase solution as in FIG. 7 with a first neutral loss value set to the molecular weight (41) of acetonitrile using a tandem mass spectrometer, in accordance with various embodiments.

FIG. 8 is an exemplary plot 800 of a neutral loss spectrum showing the intensity of a precursor ion found by performing a neutral loss scan on the same second aqueous mobile phase solution as in FIG. 7 with a first neutral loss value set to the molecular weight (41) of acetonitrile using a tandem mass spectrometer, in accordance with various embodiments. Peak 810 represents a solvent cluster with acetonitrile that will form in an aqueous mobile phase solution with or without acid modifiers. A comparison of FIG. 8 with FIG. 7 shows that relative to weak or absent peak 710 in FIG. 7, acetonitrile peak 810 in FIG. 8 is very high and distinctive. In other words, a comparison of FIG. 8 with FIG. 7 shows that acetonitrile is the likely solvent of the second aqueous mobile phase solution.

Figure 9:
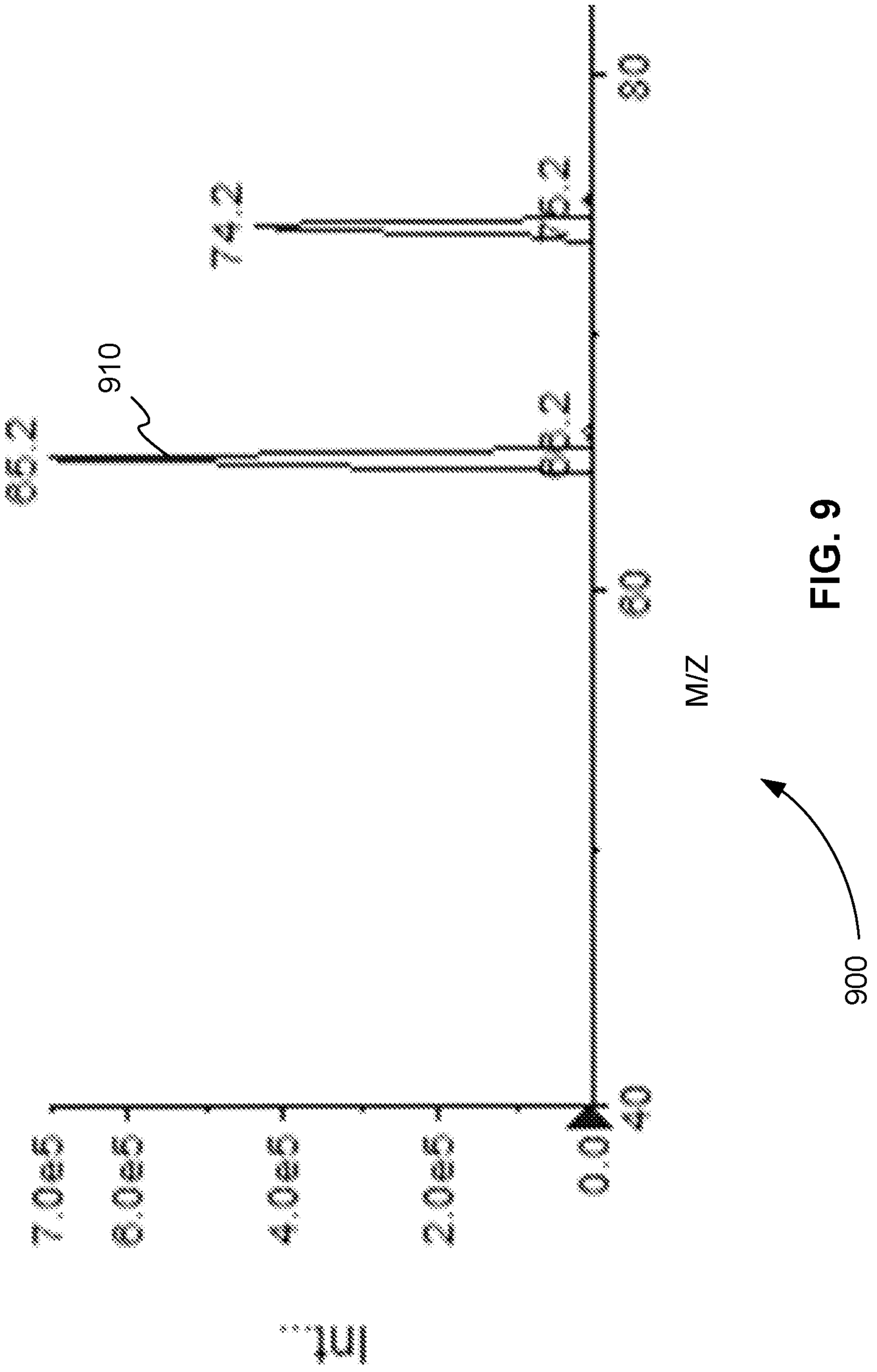
FIG. 9 is an exemplary plot of a neutral loss spectrum showing the intensity of a precursor ion found by performing a neutral loss scan on a third aqueous mobile phase solution with a neutral loss value set to the molecular weight (32) of methanol using a tandem mass spectrometer, in accordance with various embodiments.

FIG. 9 is an exemplary plot 900 of a neutral loss spectrum showing the intensity of a precursor ion found by performing a neutral loss scan on a third aqueous mobile phase solution with a neutral loss value set to the molecular weight

(32) of methanol using a tandem mass spectrometer, in accordance with various embodiments. Peak 910 represents a solvent cluster with methanol that will form in an aqueous mobile phase solution with or without acid modifiers. Peak 910 is high intensity distinctive ion.

Figure 10:
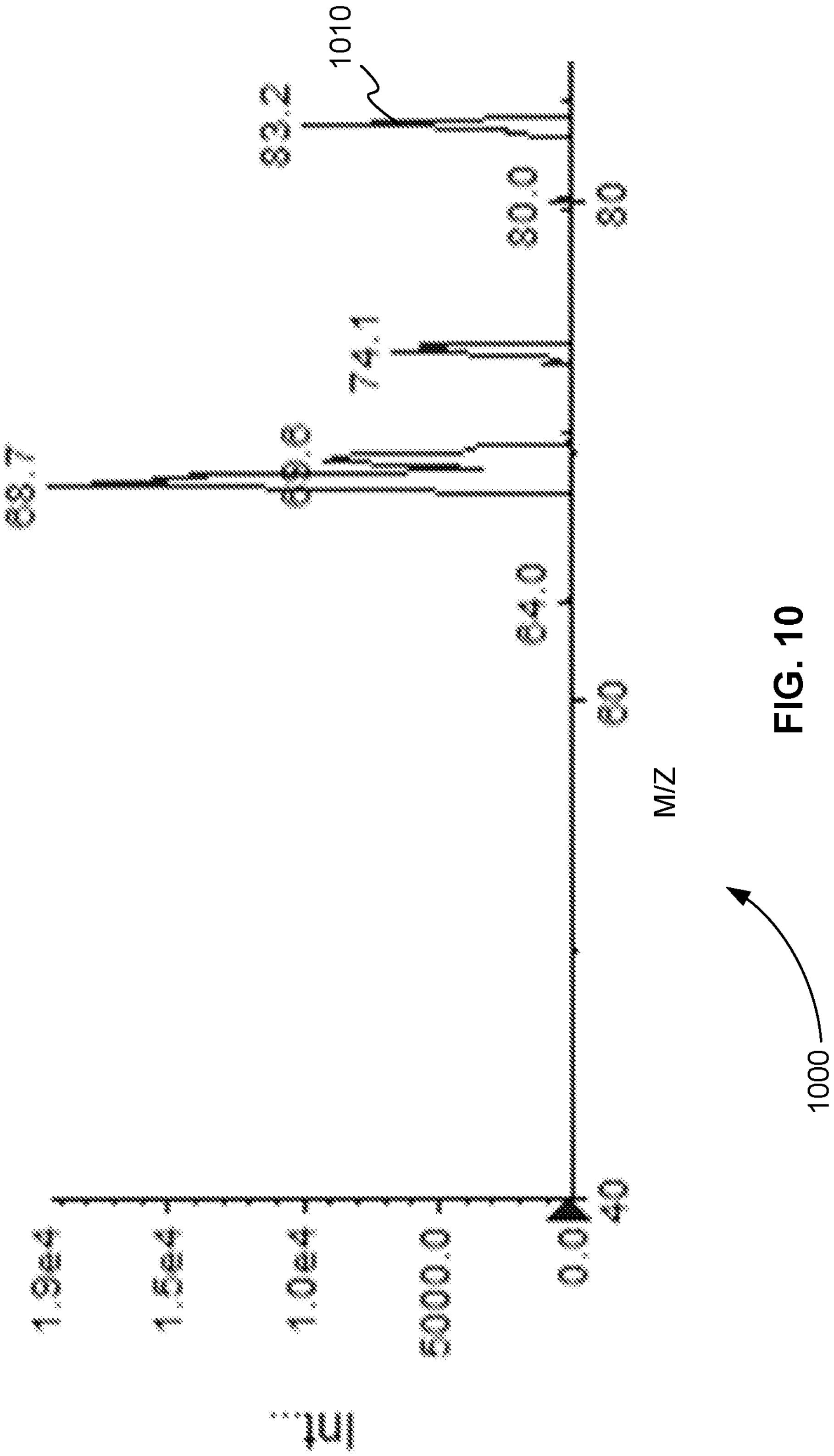
FIG. 10 is an exemplary plot of a neutral loss spectrum showing the intensity of a precursor ion found by performing a neutral loss scan on the same third aqueous mobile phase solution as in FIG. 9 with a first neutral loss value set to the molecular weight (41) of acetonitrile using a tandem mass spectrometer, in accordance with various embodiments.

FIG. 10 is an exemplary plot 1000 of a neutral loss spectrum showing the intensity of a precursor ion found by performing a neutral loss scan on the same third aqueous mobile phase solution as in FIG. 9 with a first neutral loss value set to the molecular weight (41) of acetonitrile using a tandem mass spectrometer, in accordance with various embodiments. Peak 1010 represents a solvent cluster with acetonitrile that will form in an aqueous mobile phase solution with or without acid modifiers. A comparison of FIG. 10 with FIG. 9 shows that relative to methanol peak 910 in FIG. 9, acetonitrile peak 1010 in FIG. 10 is weak or absent. In other words, a comparison of FIG. 10 with FIG. 9 shows that methanol is the likely solvent of the third aqueous mobile phase solution.

In order to more objectively determine the likely solvent in an aqueous mobile phase solution, a ratio of the measured intensities of precursor ions representing two different solvents is calculated. In various embodiments, the ratio is calculated according to log ((second intensity+1)/(first intensity+1)). This calculation prevents either the numerator or the denominator from being zero.

FIG. 11 is a table 1100 depicting the measured intensities and peak areas of the methanol and acetonitrile peaks of FIGS. 9 and 10, respectively, in accordance with various embodiments. Table 1100 shows that the intensity for methanol peak 910 in FIG. 9 is 701,000, and the intensity for acetonitrile peak 1010 in FIG. 10 is 10,000. The ratio for determining if methanol is the solvent is log ((acetonitrile peak intensity+1)/(methanol peak intensity+1)), for example. Using the intensities of table 1100 of FIG. 11, the ratio is log ((10,000+1)/(701,000+1))=−1.85.

This ratio has an absolute value that is greater than one, so methanol is objectively found to be the solvent of the third aqueous mobile phase solution. Experimental results show that when methanol is the solvent, the ratio log ((acetonitrile peak intensity+1)/(methanol peak intensity+1)) typically provides a value between −1 and −2. When acetonitrile is the solvent, the ratio log ((acetonitrile peak intensity+1)/(methanol peak intensity+1)) typically provides a value between +3 and +6.

Returning to FIG. 3, in various embodiments, the apparatus further includes a display device to provide information to a user of tandem mass spectrometer 320 about liquid sample delivery device 330. The display device can be a display device of processor 340, for example.

In various embodiments, if the aqueous mobile phase solution is properly being delivered by liquid sample delivery device 330, tandem mass spectrometer 320 displays information on the display device describing that the aqueous mobile phase solution is properly being delivered by liquid sample delivery device 330. The information can be, for example, any indication of normal operation of liquid sample delivery device 330, such as a green marking, symbol, or text.

In various embodiments, tandem mass spectrometer 320 determines if liquid sample delivery device 330 has reached a steady state of operation. For example, before the first sample is introduced into liquid sample delivery device 320 or before each additional sample is introduced into liquid sample delivery device 320, tandem mass spectrometer 320 performs the first neutral loss scan and the second neutral loss scan at two or more time periods until the rate of change in both the first intensity and the second intensity decreases below a threshold rate of change. When the rate of change in both the first intensity and the second intensity decreases below the threshold rate of change, the tandem mass spectrometer displays information on the display device describing that the liquid sample delivery device has reached a steady state.

Figure 12:
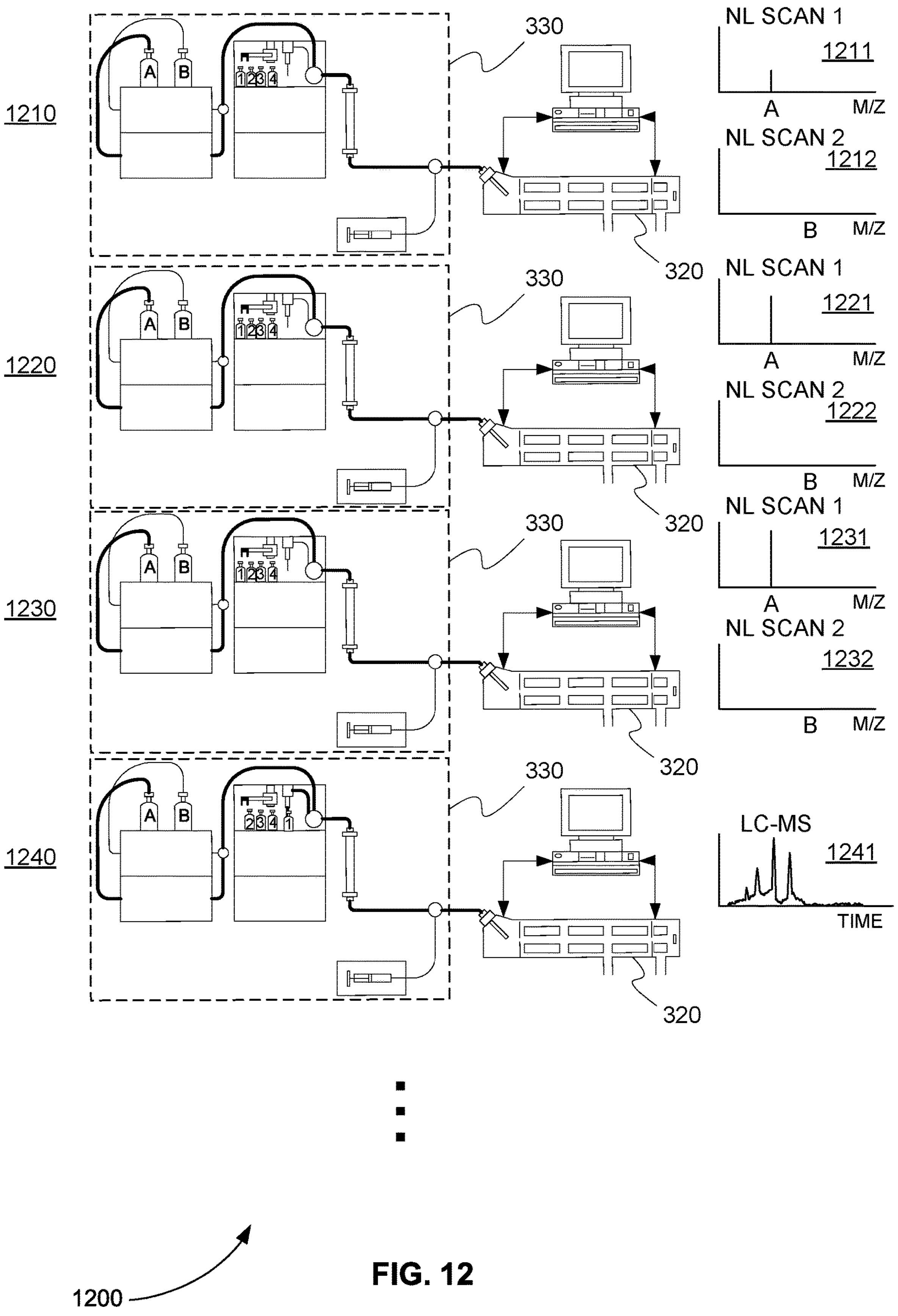
FIG. 12 is a schematic diagram showing multiple diagnostic experiments before a sample is introduced into a liquid sample delivery device to determine if the liquid sample delivery device has reached a steady state of operation, in accordance with various embodiments.

FIG. 12 is a schematic diagram 1200 showing multiple diagnostic experiments before a sample is introduced into a liquid sample delivery device to determine if the liquid sample delivery device has reached a steady state of operation, in accordance with various embodiments. For example, diagnostic experiments 1210, 1220, and 1230 are performed before a sample is introduced into liquid sample delivery device 330. Diagnostic experiments 1210, 1220, and 1230 are performed before the first sample is introduced into liquid sample delivery device 330. However, two or more diagnostic experiments can also be performed before each additional sample is introduced into liquid sample delivery device 330.

In each diagnostic experiment, tandem mass spectrometer 320 performs a first neutral loss scan and a second neutral loss scan. After each diagnostic experiment, the first intensity measured for the first neutral loss scan is compared to the first intensity measured in the previous diagnostic experiment. Also, the second intensity measured for the second neutral loss scan is compared to the second intensity measured in the previous diagnostic experiment.

For example, in diagnostic experiment 1220, the first intensity of spectrum 1221 is compared to the first intensity of spectrum 1211 for diagnostic experiment 1210. This comparison shows that the intensity of the neutral loss identifying solvent A increases significantly from diagnostic experiment 1210 to diagnostic experiment 1220. In other words, the rate of change in the first intensity of the neutral loss identifying solvent A between the first two diagnostic experiments is high. This means that liquid sample delivery device 330 has not reached a steady state.

To more objectively measure the rate of change in the first intensity, the rate of change is compared to a threshold rate of change. If the rate of change exceeds the threshold rate of change, it is determined that liquid sample delivery device 330 has not reached a steady state.

In diagnostic experiment 1220, the second intensity of spectrum 1222 is also compared to the second intensity of spectrum 1212 for diagnostic experiment 1210. This comparison shows that the intensity of the neutral loss identifying solvent B does not change from diagnostic experiment 1210 to diagnostic experiment 1220. Of course, there is no change because solvent B is not being used. In order to objectively measure the rate of change in the second intensity, the rate of change is also compared to a threshold rate of change.

Because the rate of change in the intensity of the neutral loss identifying solvent A between diagnostic experiment 1210 and diagnostic experiment 1220 exceeds a threshold rate of change, additional diagnostic experiment 1230 is performed. In diagnostic experiment 1230, the first intensity of spectrum 1231 is compared to the first intensity of spectrum 1221 for diagnostic experiment 1220. This comparison shows that the intensity of the neutral loss identifying solvent A increases only slightly from diagnostic experiment 1220 to diagnostic experiment 1230. In other words, the rate of change in the first intensity of the neutral loss identifying solvent A between diagnostic experiments

1220 and 1230 is below a threshold rate of change. This means that liquid sample delivery device 330 has now reached a steady state.

In diagnostic experiment 1230, the second intensity of spectrum 1232 is also compared to the second intensity of spectrum 1222 for diagnostic experiment 1220. However, again there is no change in the second intensity because solvent B is not being used.

Because the rates of change between diagnostic experiments 1220 and 1230 for both the first and second intensities do not exceed a threshold rate, liquid sample delivery device 330 is determined to have reached a steady state in experiment 1230. As a result, a sample is introduced into liquid sample delivery device 330 in sample LC-MS experiment 1240 and chromatogram 1241 is produced. Additional sample experiments are performed after sample experiment 1240, for example. Between each sample experiment similar multiple diagnostic experiments can be performed.

Figure 13:
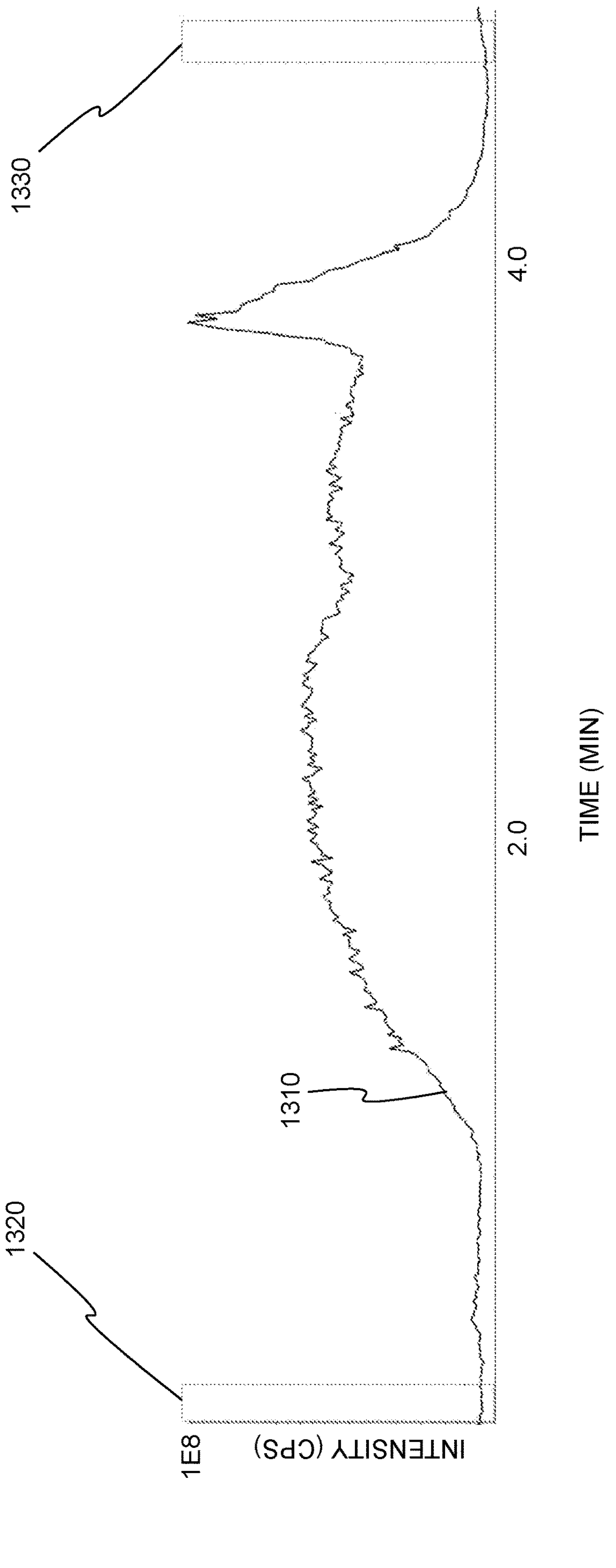
FIG. 13 is an exemplary plot of a neutral loss chromatogram for methanol showing regions before a sample analysis, during sample analysis, and after sample analysis, in accordance with various embodiments.

FIG. 13 is an exemplary plot 1300 of a neutral loss chromatogram for methanol showing regions before a sample analysis, during sample analysis, and after sample analysis, in accordance with various embodiments. Chromatogram 1310 includes region 1320 before the sample analysis and region 1330 after the sample analysis. Region 1330 is also a region before another different the sample analysis. In region 1320, chromatogram 1310 is not significantly changing and, therefore, shows an initial steady state condition. In region 1330, however, chromatogram 1310 initially has a lower intensity than the intensity in region 1320 but rises to a similar intensity. In other words, chromatogram 1310 is in an initial steady state condition in region 1320, but, in region 1330, chromatogram 1310 is increasing to a condition similar to the initial steady state condition in region 1330.

Figure 14:
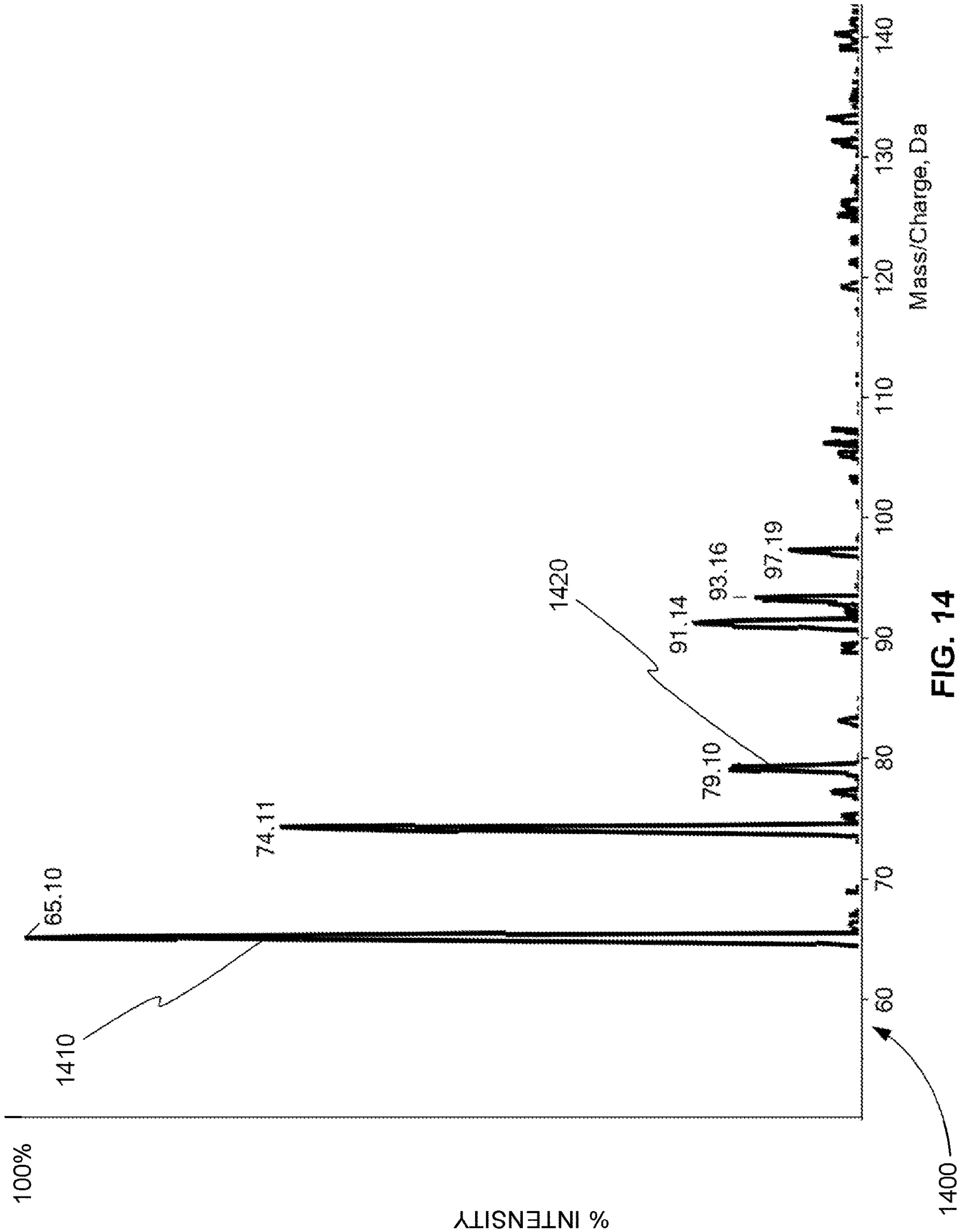
FIG. 14 is an exemplary plot of a neutral loss spectrum from the region before sample analysis in FIG. 13 showing peak intensities for the initial steady state condition, in accordance with various embodiments.

FIG. 14 is an exemplary plot 1400 of a neutral loss spectrum from the region before sample analysis in FIG. 13 showing peak intensities for the initial steady state condition, in accordance with various embodiments. Note the ratio of the intensity of methanol peak 1410 to the intensity of peak 1420 with an m/z of 79.1. The intensity of peak 1410 is much larger than the intensity of peak 1420, so the ratio is much greater than one.

Figure 15:
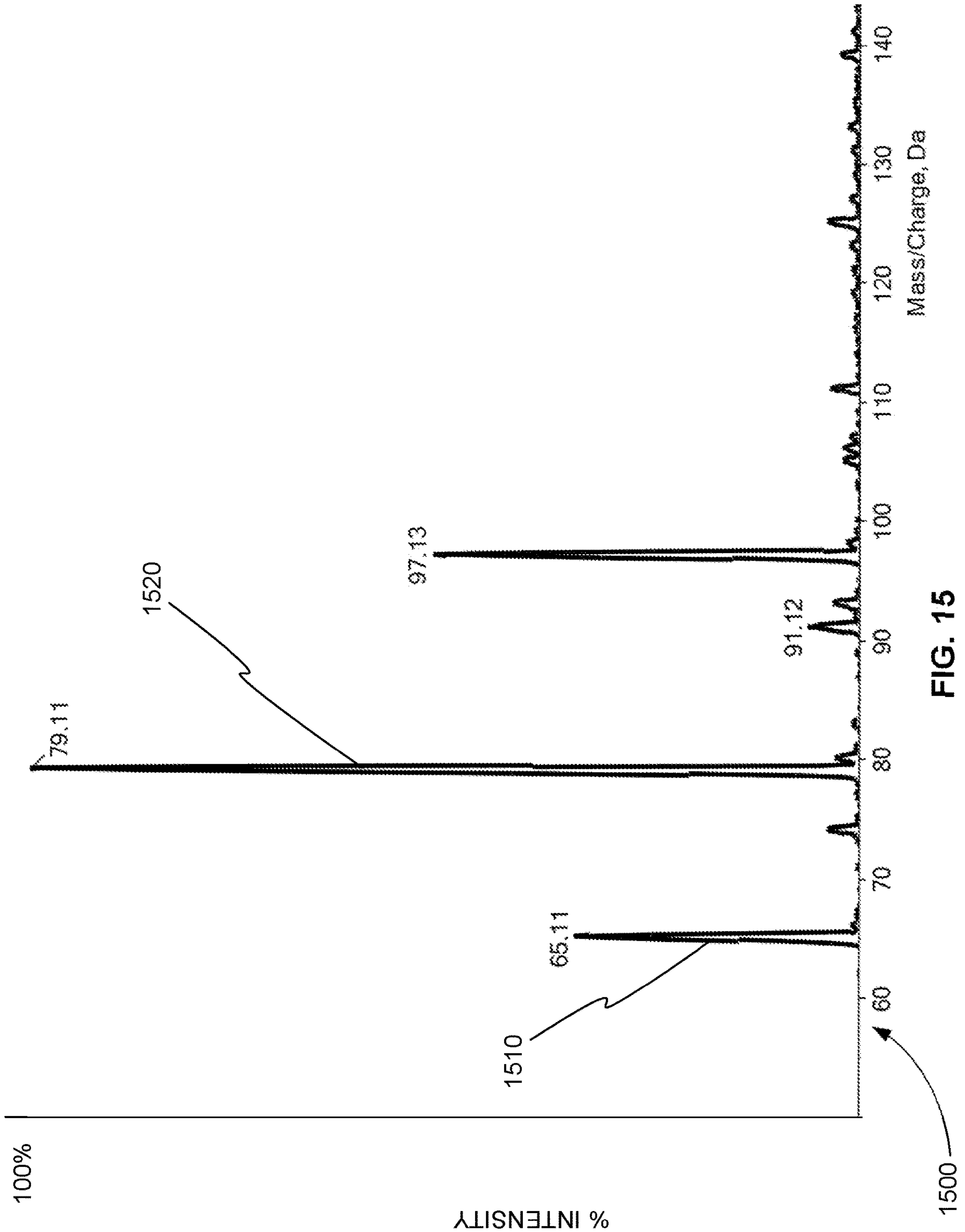
FIG. 15 is an exemplary plot of a neutral loss spectrum from the region after sample analysis in FIG. 13 showing peak intensities before the system has returned to the initial steady state condition, in accordance with various embodiments.

FIG. 15 is an exemplary plot 1500 of a neutral loss spectrum from the region after sample analysis in FIG. 13 showing peak intensities before the system has returned to the initial steady state condition, in accordance with various embodiments. Note the ratio of the intensity of methanol peak 1510 to the intensity of peak 1520 with an m/z of 79.1. The intensity of peak 1510 is now much smaller than the intensity of peak 1520, so the ratio is much less than one.

Figure 16:
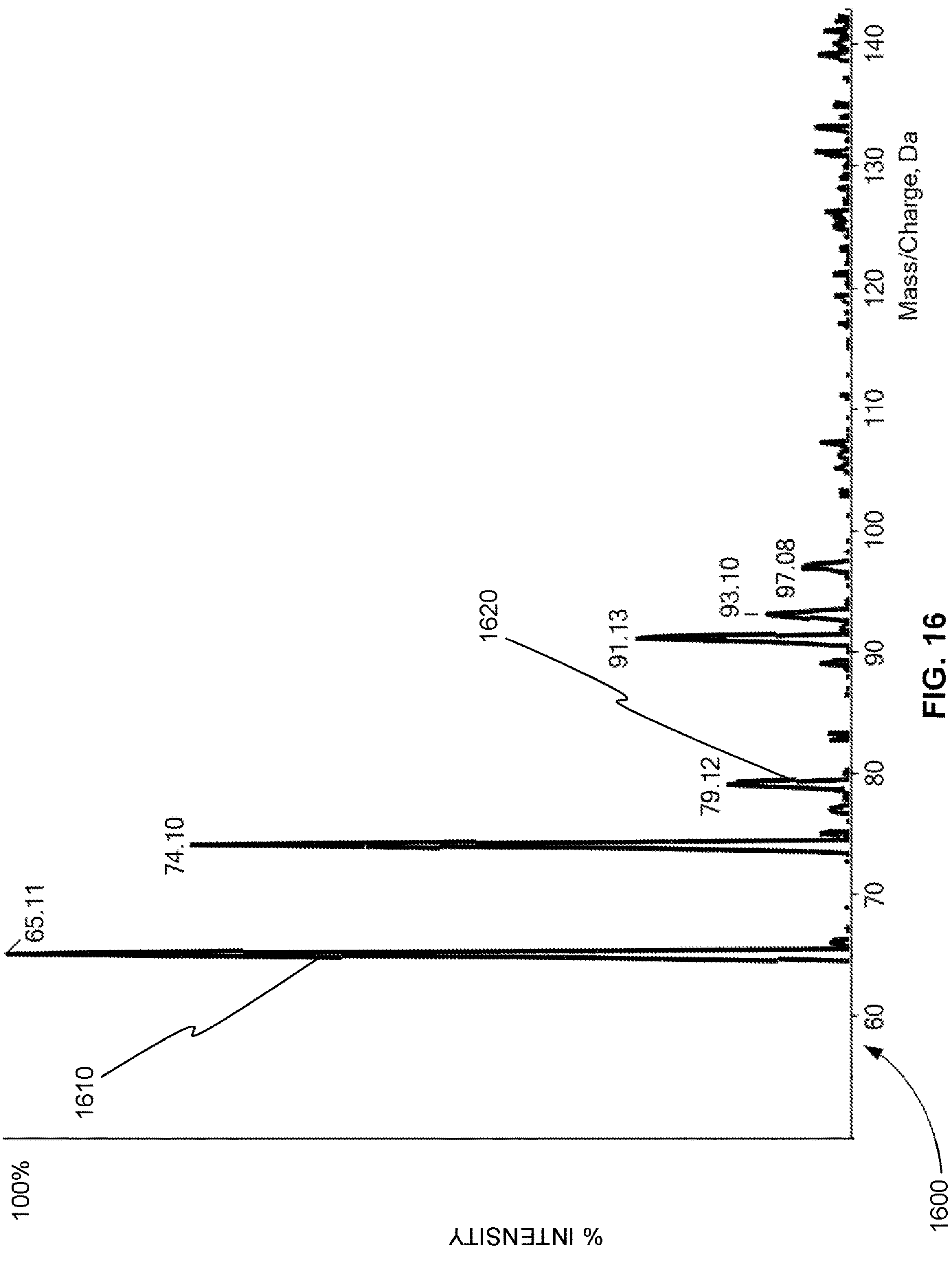
FIG. 16 is an exemplary plot of a neutral loss spectrum from the region after sample analysis in FIG. 13 showing peak intensities after the system has returned to the initial steady state condition, in accordance with various embodiments.

FIG. 16 is an exemplary plot 1600 of a neutral loss spectrum from the region after sample analysis in FIG. 13 showing peak intensities after the system has returned to the initial steady state condition, in accordance with various embodiments. Note the ratio of the intensity of methanol peak 1610 to the intensity of peak 1620 with an m/z of 79.1. The intensity of peak 1610 is now again much larger than the intensity of peak 1620, so the ratio is again much greater than one.

The spectra for FIGS. 15 and 16 are obtained using two different diagnostic experiments after the sample analysis but before another sample analysis is begun. As a result, FIGS. 15 and 16 illustrate how performing multiple diagnostic experiments before a sample is introduced into a liquid sample delivery device can be used to determine if the liquid sample delivery device has reached a steady state of operation.

Returning to FIG. 3, in various embodiments, the apparatus further includes a memory device (not shown). The memory device can be a memory device of processor 340, for example. Each time tandem mass spectrometer 320 calculates the ratio, tandem mass spectrometer 320 stores the ratio in the memory device.

In various embodiments, tandem mass spectrometer 320 determines if liquid sample delivery device 330 changes between sample experiments. Between sample introductions into liquid sample delivery device 330 and after tandem mass spectrometer 320 calculates the ratio, tandem mass spectrometer 320 compares the ratio to a ratio previously stored in the memory device. If the ratio differs by more than a threshold difference from the ratio previously stored in the memory device, tandem mass spectrometer 320 displays information on the display device describing that the aqueous mobile phase solution has changed.

In various embodiments, the first known solvent is methanol and the second known solvent is one of acetonitrile, isopropyl alcohol (IPA), or acetone. In various embodiments, the first known solvent is acetonitrile and the second known solvent is one of methanol, IPA, or acetone. In other words, the first known solvent and the second known solvent can be any permutation of methanol, acetonitrile, IPA, or acetone as long as the first known solvent and the second known solvent are not the same solvent.

In various embodiments, neutral loss scans are performed for more than two solvents, and ratios are calculated for every permutation of two difference solvents. For example, before the sample is introduced into liquid sample delivery device 330 or between sample introductions into liquid sample delivery device 330, tandem mass spectrometer 320 further performs a third neutral loss scan of the ion beam with a third neutral loss value set to a molecular weight of a third known solvent, producing a third intensity. Tandem mass spectrometer 320 calculates a second ratio of the first intensity to the third ion current and calculates a third ratio of the second intensity to the third ion current. Tandem mass spectrometer 320 determines if the aqueous mobile phase solution is properly being delivered by liquid sample delivery device 330 based on the ratio, the second ratio, or the third ratio.

In various embodiments, neutral loss scans are also performed for more than two mobile phase additives to assess the performance of liquid sample delivery device 330. For example, before the sample is introduced into liquid sample delivery device 330 or between sample introductions into liquid sample delivery device 330, tandem mass spectrometer 320 further performs a third neutral loss scan of the ion beam with a third neutral loss value set to a molecular weight of a first known mobile phase additive, producing a third intensity. Tandem mass spectrometer 320 performs a fourth neutral loss scan of the ion beam with a fourth neutral loss value set to a molecular weight of a second known mobile phase additive, producing a fourth intensity. Tandem mass spectrometer 320 calculates a second ratio of the third intensity to the fourth ion current. Tandem mass spectrometer 320 determines that a mobile phase additive is properly being delivered by liquid sample delivery device 330 based on the second ratio.

In various embodiments, the ratio of ion currents for mobile phase additive neutral loss scans is also stored in the memory device. For example, each time tandem mass spectrometer 320 calculates the second ratio, tandem mass spectrometer 320 stores the second ratio in a memory.

In various embodiments, tandem mass spectrometer 320 also determines if liquid sample delivery device 330 changes between sample experiments based on the mobile phase additive neutral loss scans. For example, between sample introductions into liquid sample delivery device 330 and after tandem mass spectrometer 320 calculates the second ratio, tandem mass spectrometer 320 compares the second ratio to a second ratio previously stored in the memory device. If the second ratio differs by more than a threshold difference from the ratio previously stored in the memory device, tandem mass spectrometer 320 displays information on the display device describing that the mobile phase additive has changed.

In various embodiments, the first known mobile phase additive is formic acid and the second known mobile phase additive is acetic acid. The first known mobile phase additive and the second known mobile phase additive can, however, be any additive as long as the first known mobile phase additive and the second known mobile phase additive are different mobile phase additives.

In various embodiments, processor 340 is used to control or provide instructions to ion source device 310 and tandem mass spectrometer 320 and to analyze data collected. Processor 340 controls or provides instructions by, for example, controlling one or more voltage, current, or pressure sources (not shown). Processor 340 can be a separate device as shown in FIG. 3 or can be a processor or controller of one or more devices of tandem mass spectrometer 320. Processor 340 can be, but is not limited to, a controller, a computer, a microprocessor, the computer system of FIG. 1, or any device capable of sending and receiving control signals and data.

Method for Aqueous Mobile Phase Solution Delivery Assessment

Figure 17:
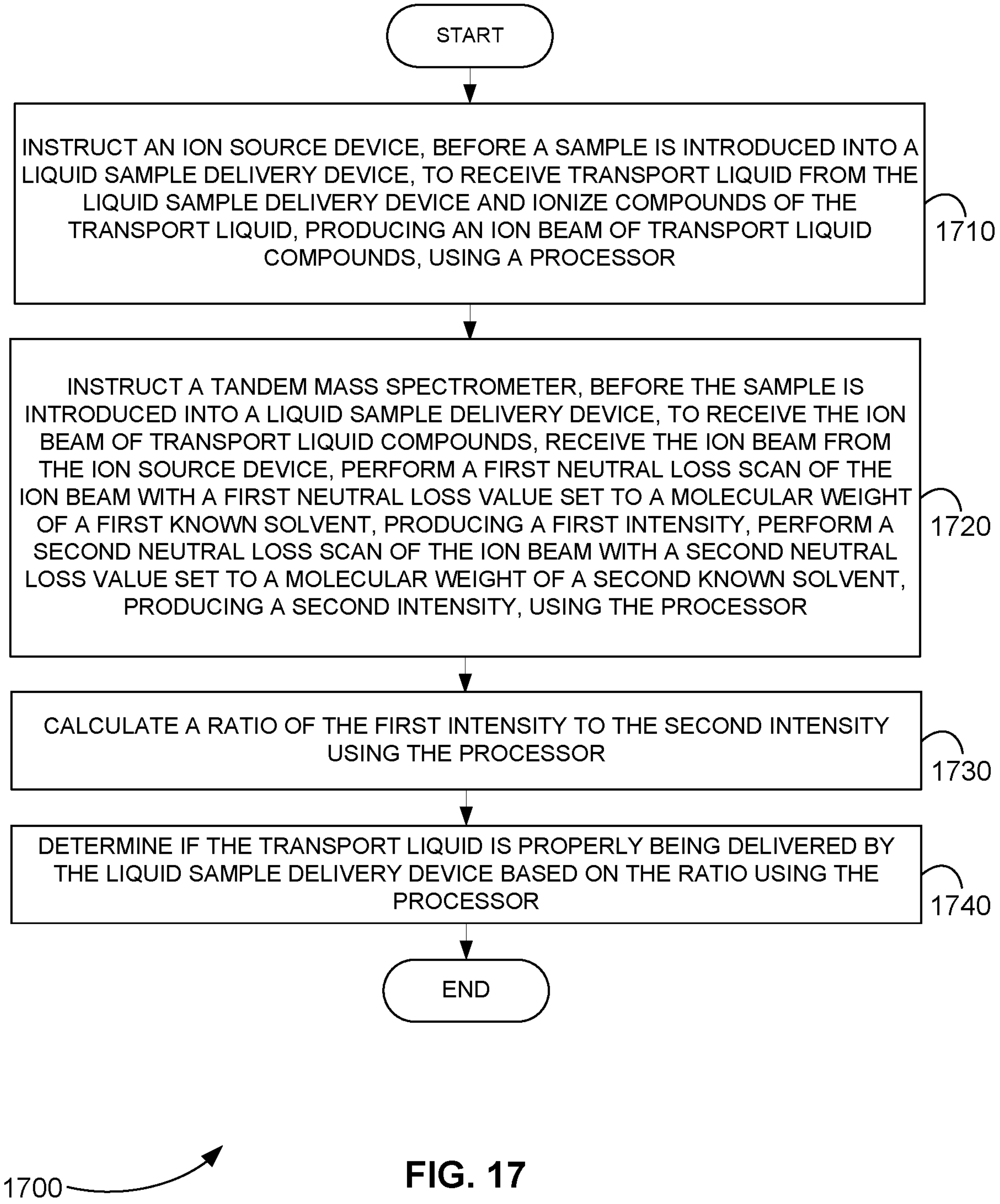
FIG. 17 is a flowchart showing a method for determining if an aqueous mobile phase solution is properly being delivered by a mass spectrometry liquid sample delivery device, in accordance with various embodiments.

FIG. 17 is a flowchart 1700 showing a method for determining if an aqueous mobile phase solution is properly being delivered by a mass spectrometry liquid sample delivery device, in accordance with various embodiments.

In step 1710 of method 1700, before a sample is introduced into a liquid sample delivery device, an ion source device is instructed to receive aqueous mobile phase solution from the liquid sample delivery device and ionize compounds of the aqueous mobile phase solution, producing an ion beam of aqueous mobile phase solution compounds, using a processor.

In step 1720, before the sample is introduced into a liquid sample delivery device or between sample introductions into the liquid sample delivery device, a tandem mass spectrometer is instructed to receive the ion beam of aqueous mobile phase solution compounds from the ion source device, perform a first neutral loss scan of the ion beam with a first neutral loss value set to a molecular weight of a first known solvent, producing a first intensity, and perform a second neutral loss scan of the ion beam with a second neutral loss value set to a molecular weight of a second known solvent, producing a second intensity, using the processor.

In step 1730, a ratio of the first intensity to the second intensity is calculated using the processor.

In step 1740, it is determined if the aqueous mobile phase solution is properly being delivered by the liquid sample delivery device based on the ratio using the processor.

Computer Program Product for Aqueous Mobile Phase Solution Delivery Assessment

In various embodiments, computer program products include a tangible computer-readable storage medium whose contents include a program with instructions being executed on a processor so as to perform a method for determining if an aqueous mobile phase solution is properly being delivered by a mass spectrometry liquid sample delivery device. This method is performed by a system that includes one or more distinct software modules.

Figure 18:
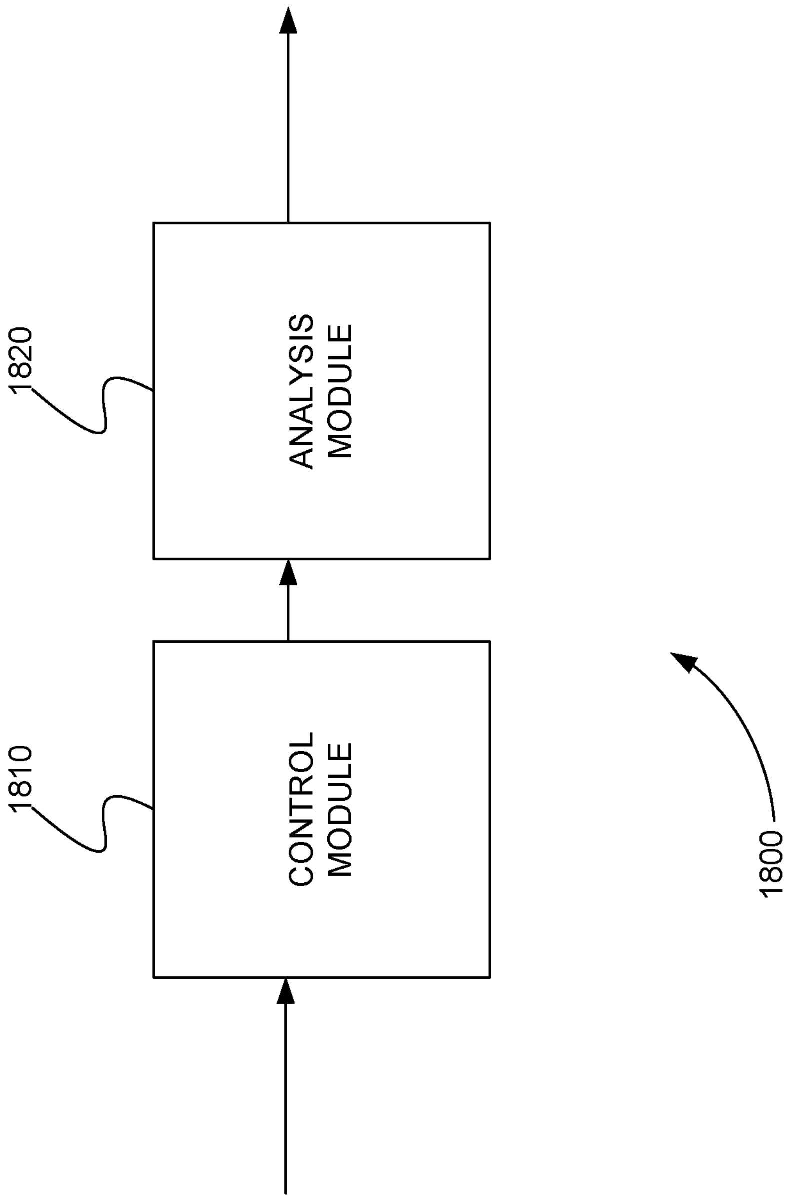
FIG. 18 is a schematic diagram of a system that includes one or more distinct software modules that perform a method for determining if an aqueous mobile phase solution is properly being delivered by a mass spectrometry liquid sample delivery device, in accordance with various embodiments.

FIG. 18 is a schematic diagram of a system 1800 that includes one or more distinct software modules that perform a method for determining if an aqueous mobile phase solution is properly being delivered by a mass spectrometry liquid sample delivery device, in accordance with various embodiments. System 1800 includes a control module 1810 and an analysis module 1820.

Control module 1810 instructs an ion source device, before a sample is introduced into a liquid sample delivery device, to receive aqueous mobile phase solution from the liquid sample delivery device and ionize compounds of the aqueous mobile phase solution, producing an ion beam of aqueous mobile phase solution compounds.

Also, before the sample is introduced into a liquid sample delivery device or between sample introductions into the liquid sample delivery device, control module 1810 instructs a tandem mass spectrometer to perform a number of steps. Control module 1810 instructs a tandem mass spectrometer to receive the ion beam of aqueous mobile phase solution compounds from the ion source device. Control module 1810 instructs a tandem mass spectrometer perform a first neutral loss scan of the ion beam with a first neutral loss value set to a molecular weight of a first known solvent, producing a first intensity. Control module 1810 instructs a tandem mass spectrometer to perform a second neutral loss scan of the ion beam with a second neutral loss value set to a molecular weight of a second known solvent, producing a second intensity.

Analysis module 1820 calculates a ratio of the first intensity to the second intensity. Analysis module 1820 determines if the aqueous mobile phase solution is properly being delivered by the liquid sample delivery device based on the ratio.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. Apparatus for determining if an aqueous mobile phase solution is properly being delivered by a mass spectrometry liquid sample delivery device, comprising:

an ion source device that, before a sample is introduced into a liquid sample delivery device, receives the aqueous mobile phase solution from the liquid sample delivery device and ionizes compounds of the aqueous mobile phase solution, producing an ion beam of aqueous mobile phase solution compounds;

a tandem mass spectrometer that, before the sample is introduced into a liquid sample delivery device, or after analysis of the sample but before another sample is introduced into the liquid sample delivery device, receives the ion beam of aqueous mobile phase solution compounds from the ion source device, performs a first neutral loss scan of the ion beam with a first neutral loss value set to a molecular weight of a first known solvent, producing a first intensity, and performs a second neutral loss scan of the ion beam with a second neutral loss value set to a molecular weight of a second known solvent, producing a second intensity; and a controller that calculates a ratio of the first intensity to the second intensity, and determines, based on the calculated ratio being constant for intensity measurements from first and second neutral loss scans, performed at different time periods using respective first and second neutral loss values, that the aqueous mobile phase solution reached steady state conditions.

2. The apparatus of claim 1, further comprising a display device, wherein upon determination that the aqueous mobile phase solution reached steady state conditions, the display device displays information describing that the aqueous mobile phase solution is properly being delivered by the liquid sample delivery device.

3. The apparatus of claim 2, wherein, before the sample is introduced into the liquid sample delivery device, the tandem mass spectrometer performs the first neutral loss scan and the second neutral loss scan at two or more time periods until the rate of change in both the first intensity and the second intensity decreases below a threshold rate of change and, when the rate of change in both the first intensity and the second intensity decreases below the threshold rate of change, the display device displays information on describing that the liquid sample delivery device has reached a steady state.

4. The apparatus of claim 2, further includes a memory device, wherein, each time the controller calculates the ratio, the the controller stores the ratio in the memory device.

5. The apparatus of claim 4, wherein, between sample introductions into the liquid sample delivery device and after the tandem mass spectrometer calculates the ratio, the tandem mass spectrometer compares the ratio to a ratio previously stored in the memory device, and, if the ratio differs by more than a threshold difference from the ratio previously stored in the memory device, the display device displays information on the display device describing that the aqueous mobile phase solution has changed.

6. The apparatus of claim 2, wherein tandem mass spectrometer, before the sample is introduced into the liquid sample delivery device, or after analysis of the sample but before the other sample is introduced into the liquid sample delivery device, further performs a third neutral loss scan of the ion beam with a third neutral loss value set to a molecular weight of a first known mobile phase additive, producing a third intensity, performs a fourth neutral loss scan of the ion beam with a fourth neutral loss value set to a molecular weight of a second known mobile phase additive, producing a fourth intensity, and wherein the controller calculates a second ratio of the third intensity to the fourth ion current, and determines if that an additive, in combination with the aqueous mobile phase solution, reached steady state conditions based on the second ratio.

7. The apparatus of claim 6, further includes a memory device, wherein, each time the controller calculates the second ratio, the controller stores the second ratio in the memory device.

8. The apparatus of claim 7, wherein, between sample introductions into the liquid sample delivery device and after the controller calculates the second ratio, the controller compares the second ratio to a second ratio previously stored in the memory device, and, if the second ratio differs by more than a threshold difference from the ratio previously stored in the memory device, the display device displays information on the display device describing that the mobile phase additive has changed.

9. The apparatus of claim 6, wherein the first known mobile phase additive comprises formic acid and the second known mobile phase additive comprises acetic acid.

10. The apparatus of claim 1, wherein the first known solvent comprises methanol and the second known solvent comprises one of acetonitrile, isopropyl alcohol (IPA), or acetone.

11. The apparatus of claim 1, wherein the first known solvent comprises acetonitrile and the second known solvent comprises one of methanol, isopropyl alcohol (LPA), or acetone.

12. The apparatus of claim 1, wherein the tandem mass spectrometer, before the sample is introduced into the liquid sample delivery device, or after analysis of the sample but before the other sample is introduced into the liquid sample delivery device, further performs a third neutral loss scan of the ion beam with a third neutral loss value set to a molecular weight of a third known solvent, producing a third intensity, and wherein the controller further calculates a second ratio of the first intensity to the third ion current, calculates a third ratio of the second intensity to the third ion current, and determines that the aqueous mobile phase solution reached steady state conditions based on the ratio, the second ratio, or the third ratio.

13. The apparatus of claim 1, wherein the ion source device comprises an electrospray ionization (ESI) ion source device or an atmospheric pressure chemical ionization (APCI) ion source device and the tandem mass spectrometer comprises a triple quadrupole (QqQ) device or a quadrupole linear ion trap (QqLIT) device.

14. A method for determining if an aqueous mobile phase solution is properly being delivered by a mass spectrometry liquid sample delivery device, comprising:

Instructing, using a processor, an ion source device, before a sample is introduced into a liquid sample delivery device, to receive the aqueous mobile phase solution from the liquid sample delivery device and ionize compounds of the aqueous mobile phase solution, producing an ion beam of aqueous mobile phase solution compounds;

instructing using the processor a tandem mass spectrometer, before the sample is introduced into a liquid sample delivery device, or after analysis of the sample but before another sample is introduced into the liquid sample delivery device, to receive the ion beam of aqueous mobile phase solution compounds from the ion source device, perform a first neutral loss scan of the ion beam with a first neutral loss value set to a molecular weight of a first known solvent, producing a first intensity, and perform a second neutral loss scan of the ion beam with a second neutral loss value set to a molecular weight of a second known solvent, producing a second intensity;

calculating a ratio of the first intensity to the second intensity using the processor; and determining using the processor, based on the calculated ratio being constant for intensity measurements from first and second neutral loss scans, performed at different time periods using respective first and second neutral loss values, that the aqueous mobile phase solution reached steady state conditions.

15. The method apparatus of claim 14, further comprising:

displaying upon determination that the aqueous mobile phase solution reached steady state conditions, information describing that the aqueous mobile phase solution is properly being delivered by the liquid sample delivery device.

16. The method of claim 15, further comprising:

performing, before a sample is introduced into the liquid sample delivery device, the first neutral loss scan and the second neutral loss scan at two or more time periods until the rate of change in both the first intensity and the second intensity decreases below a threshold rate of change and;

displaying, when the rate of change in both the first intensity and the second intensity decreases below the threshold rate of change, information describing that the liquid sample delivery device has reached a steady state.

17. The method of claim 14, wherein the first known solvent comprises methanol and the second known solvent comprises one of acetonitrile, isopropyl alcohol (IPA), or acetone.

18. The method of claim 14, wherein the first known solvent comprises acetonitrile and the second known solvent comprises one of methanol, isopropyl alcohol (LPA), or acetone.

19. The method of claim 14, further comprising:

performing, before the sample is introduced into the liquid sample delivery device, or after analysis of the sample but before the other sample is introduced into the liquid sample delivery device, a third neutral loss scan of the ion beam with a third neutral loss value set to a molecular weight of a third known solvent, producing a third intensity; and calculating a second ratio of the first intensity to the third ion current, calculating a third ratio of the second intensity to the third ion current, and determining that the aqueous mobile phase solution reached steady state conditions based on the ratio, the second ratio, or the third ratio.

20. A computer program product, comprising a non-transitory and tangible computer-readable storage medium whose contents include a program with instructions being executed on a processor to perform a method for determining if an aqueous mobile phase solution is properly being delivered by a mass spectrometry liquid sample delivery device, the method comprising:

providing a system, wherein the system comprises one or more distinct software modules, and wherein the distinct software modules comprise a control module and an analysis module;

instructing an ion source device, before a sample is introduced into a liquid sample delivery device, to receive the aqueous mobile phase solution from the liquid sample delivery device and ionize compounds of the aqueous mobile phase solution, producing an ion beam of aqueous mobile phase solution compounds, using the control module;

instructing a tandem mass spectrometer, before the sample is introduced into a liquid sample delivery device, or after analysis of the sample but before another sample is introduced into the liquid sample delivery device, to receive the ion beam of aqueous mobile phase solution compounds from the ion source device, perform a first neutral loss scan of the ion beam with a first neutral loss value set to a molecular weight of a first known solvent, producing a first intensity, and perform a second neutral loss scan of the ion beam with a second neutral loss value set to a molecular weight of a second known solvent, producing a second intensity, using the control module;

calculating a ratio of the first intensity to the second intensity using the analysis module; and determining using the analysis module, based on the calculated ratio being constant for intensity measurements from first and second neutral loss scans, performed at different time periods using respective first and second neutral loss values, that the aqueous mobile phase solution reached steady state conditions.

* * * * *